US009344696B2

(12) United States Patent
Kempf et al.

(10) Patent No.: US 9,344,696 B2
(45) Date of Patent: May 17, 2016

(54) METHODS AND APPARATUS FOR OPTICAL DISPLAY USING MULTIPLE SPATIAL LIGHT MODULATORS FOR INCREASED RESOLUTION

(71) Applicant: Texas Instruments Incorporated, Dallas, TX (US)

(72) Inventors: Jeffrey Matthew Kempf, Dallas, TX (US); Gregory Scott Pettitt, Farmersville, TX (US); Michael Terry Davis, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/808,893

(22) Filed: Jul. 24, 2015

(65) Prior Publication Data

US 2016/0037147 A1    Feb. 4, 2016

Related U.S. Application Data

(60) Provisional application No. 62/030,244, filed on Jul. 29, 2014.

(51) Int. Cl.
*H04N 5/64* (2006.01)
*H04N 9/31* (2006.01)
*G09G 5/18* (2006.01)
(Continued)

(52) U.S. Cl.
CPC ............ *H04N 9/3188* (2013.01); *G06T 3/40* (2013.01); *G09G 5/02* (2013.01); *G09G 5/18* (2013.01)

(58) Field of Classification Search
USPC ......... 348/744, 719, 721, 724, 739, 743, 750, 348/756, 758, 759, 766, 779, 780, 781, 782, 348/783, 661, 642, 629, 628, 563, 564, 584, 348/586, 445, 477, 333.11, 370, 383, 398, 348/264, 269, 131, 57, 58, 68, 70; 353/20, 353/29, 30, 31, 33, 34, 70, 74, 81, 84, 94; 349/8, 9, 113
See application file for complete search history.

(56) References Cited

U.S. PATENT DOCUMENTS 5,309,188 A    5/1994 Burstyn
5,490,009 A    2/1996 Venkateswar et al.
(Continued)

FOREIGN PATENT DOCUMENTS

EP    0790514 A2    8/1997

*Primary Examiner* — Jefferey Harold
*Assistant Examiner* — Mustafizur Rahman
(74) *Attorney, Agent, or Firm* — Michael A. Davis, Jr.; Frank D. Cimino

(57) ABSTRACT

A system for displaying a high resolution video image utilizing multiple spatial light modulators includes at least one illumination source configured to provide illumination to multiple spatial light modulators; a video data image processor coupled to receive video image data at a first visual resolution of X by Y pixels; and multiple spatial light modulators each having an image resolution lower than the first visual resolution, each configured to project an image sub-frame onto a focal plane using an image projection system; wherein the image projection system is configured to project a first sub-frame image of a first color portion while simultaneously projecting at least a second sub-frame image of a second color portion onto the focal plane, and the first and second sub-frame images are offset from one another, so that when viewed together a viewed image has at least the first visual resolution. Methods are disclosed.

34 Claims, 16 Drawing Sheets

(51) Int. Cl.
*G09G 5/02* (2006.01)
*G06T 3/40* (2006.01)

(56) References Cited

U.S. PATENT DOCUMENTS

| | | | |
|---|---|---|---|
| 7,237,909 B2* | 7/2007 | Yokote | G03B 21/00 |
| | | | 353/30 |
| 7,330,298 B2 | 2/2008 | Bommersbach et al. | |
| 7,553,024 B2* | 6/2009 | Ouchi | G02B 27/1026 |
| | | | 349/9 |
| 7,876,405 B2* | 1/2011 | Ito | G02F 1/29 |
| | | | 349/113 |
| 8,096,664 B2 | 1/2012 | Yazaki | |
| 8,149,244 B2* | 4/2012 | Fujimori | G09G 5/006 |
| | | | 341/61 |
| 8,220,935 B2 | 7/2012 | Huang et al. | |
| 8,523,362 B2* | 9/2013 | Huang | G03B 33/12 |
| | | | 349/8 |
| 8,777,425 B2* | 7/2014 | Miyazawa | H04N 9/315 |
| | | | 353/98 |
| 8,891,010 B1* | 11/2014 | Woodall | H04N 21/440263 |
| | | | 348/445 |
| 8,976,208 B2* | 3/2015 | Kim | G09G 3/3648 |
| | | | 345/50 |
| 2002/0154696 A1* | 10/2002 | Tardif | G06T 3/4084 |
| | | | 375/240.16 |
| 2005/0052578 A1* | 3/2005 | Phillips | G08B 27/005 |
| | | | 348/584 |
| 2005/0097476 A1* | 5/2005 | Arora | G06F 3/1423 |
| | | | 715/800 |
| 2005/0219478 A1* | 10/2005 | Yoshii | G03B 21/00 |
| | | | 353/99 |
| 2006/0250582 A1* | 11/2006 | Piehler | G03B 21/14 |
| | | | 353/20 |
| 2006/0274278 A1* | 12/2006 | Lee | G03B 21/2013 |
| | | | 353/53 |
| 2007/0139620 A1* | 6/2007 | Bruzzone | G02B 27/1026 |
| | | | 353/20 |
| 2007/0297061 A1* | 12/2007 | Kyomoto | G02B 27/1053 |
| | | | 359/618 |
| 2008/0088800 A1 | 4/2008 | Bellis et al. | |
| 2008/0180638 A1* | 7/2008 | Hsiung | G03B 21/14 |
| | | | 353/20 |
| 2008/0252854 A1* | 10/2008 | Liao | G03B 33/12 |
| | | | 353/31 |
| 2009/0103053 A1* | 4/2009 | Ichikawa | H04N 5/7458 |
| | | | 353/33 |
| 2009/0262262 A1* | 10/2009 | Itoh | G03B 21/14 |
| | | | 348/760 |
| 2010/0045938 A1* | 2/2010 | Lin | G02B 27/1033 |
| | | | 353/33 |
| 2013/0229631 A1* | 9/2013 | Toyooka | G03B 21/204 |
| | | | 353/31 |

* cited by examiner

METHODS AND APPARATUS FOR OPTICAL DISPLAY USING MULTIPLE SPATIAL LIGHT MODULATORS FOR INCREASED RESOLUTION

RELATED APPLICATIONS

This patent application claims the benefit of priority under 35 U.S.C. 119(e) to U.S. Provisional Patent Application Ser. No. 62/030,244 entitled "LOW COST OPTICAL ARCHITECTURE FOR INCREASED RESOLUTION,", filed Jul. 29, 2014, which is hereby incorporated by reference herein in its entirety.

TECHNICAL FIELD

Aspects of the present application relate generally to the use of digital display devices for displaying images and to methods for displaying video content recorded or created at very high resolution. The arrangements include signal processing, illumination sources, spatial light modulators, and projection optics. Signal processing techniques are used in conjunction with the use of multiple spatial light modulators to correctly display high resolution video content using lower resolution devices and without visual artifacts. Increasingly, advances in the displayed image resolution are required or desired in these video projection systems.

BACKGROUND

Aspects of the present application relate generally to the use of digital optical devices for image projection. The projection systems include illumination sources, image processing, spatial light modulators, and projection optics. The illumination sources project light onto one or more of the spatial light modulators. The illumination light is incident on the spatial light modulators and is changed by the spatial light modulators based on corresponding frame image data to modulate the light and so form an image, which is transmitted into a projection system and the projection system projects an image on a screen, wall, reverse screen or other display surface for viewing. Video sources provide brightness and/or color and image data for projection by the system. Increasingly, increased resolution in the displayed images are desired in these video projection systems. Recent advances include new higher resolution standards for video content delivered in increasingly higher resolution formats such as ultra-high definition (UHD), 4K display resolution and Ultra HD, which require about 4 times the pixel count used in the prior standard 1080 p format of 1080 pixel rows by 1920 pixel columns. A 4K resolution device doubles both the number of rows of pixels and the number of columns from prior high resolution devices, which results in a pixel count that is approximately 4 times the total number of 1080 p pixels.

The advantage of the increasing number of pixels is the information provided in each viewed frame in the display stream is increased, resulting in increasingly visually sharper images. This is especially noticeable to the human visual system (HVS) in settings where the viewer sits very close to the screen, while in the prior lower resolution standards such as SD and HD, the viewer can sometimes see the "screen door" effect as individual pixel boundaries become visible at certain viewing distances, while for 4K or UHD resolution displays, this effect is much harder to see.

In recent years the use of spatial light modulators to project images in environments such as in home theatre applications, in cinemas and for business projection, religious and education projection settings is increasing. Other applications for digital projection systems include office and home video projection systems, portable video projectors, and the like. For systems using digital micro-mirror device (DMD) technology, a spatial light modulator is implemented using the DMD to form a reflective spatial light modulator (SLM). Alternative SLMs include liquid crystal on silicon (LCoS) and liquid crystal display (LCD). For the purpose of the present application, the term "SLM" includes any spatial light modulator, even though certain examples described herein may illustrate systems using DMDs for use in describing the various applications. The use of DMDs can be used to form digital projection systems referred to as "DLP", a registered trademark of Texas Instruments. DLP® systems have been developed and are commercially available from Texas Instruments Incorporated, the owner of the present application.

As digital image projection systems continue to improve and advance, increasingly higher resolution in the displayed images is required. One approach to increasing the resolution of a displayed image in a single SLM system is to increase the number of pixel elements (for a DMD, each pixel is provided by an individually addressable movable mirrored surface of a micro electro-mechanical device, or (MEMS)). In order to simply display a UHD image using a single SLM, the SLM device would have to have the requisite number of pixels. Increasing the number of mirrors to a higher resolution results in an increased DMD device die size and results in higher costs of production of the DMD device in a semiconductor fabrication facility, and, a correspondingly lower yield. Further, the optical elements in the illumination system that are used to direct light to the surface of the DMD, and the projection optics used to project the reflected images from the DMD and out of the system for display also have to be improved and thus costs for the optics also increase. Additional complexity and costs can occur due to the need to deal with diffraction that results from the decreased pixel size, for example. All of these factors result in increasing SLM device costs and a higher bill of materials for the projection system when SLM size is increased.

A prior known technique for increasing a perceived image resolution is to use an optical actuator in the projection path. In this approach, the SLM surface projects two display images that are created from the incoming image frames and are split into sub-frames for each one of the displayed high resolution image frames. After displaying a first sub-frame for a portion of a frame display time, an optical actuator positioned in the projection path shifts the position of the SLM frames by an amount less than a pixel distance in the horizontal direction, and a second sub frame is displayed for a second portion of a frame time. By shifting back and forth, the image resolution in the image observed by the viewer is increased over the number of physical mirrors by a factor of 2. In this manner a smaller resolution DMD (for example, ½ the number of mirrors) can be used to produce an image with a visual resolution that appears greater than the resolution obtained simply from the number of mirror elements in the DMD.

Use of the optical actuator in this known prior approach results in an image resolution with an apparent increase in the resolution of the image viewed by the viewer. The two images from the two SLM positions are time interleaved sub-frame images so they are not displayed at the same time but instead, are presented in interleaved time periods, taking advantage of the integration characteristics of the HVS. The illumination available in the system is then also split between the two sub-frames. The inclusion of an optical actuator in the optical path will result in a slight loss in brightness.

U.S. Pat. No. 5,490,009, issued Feb. 6, 1996, and assigned to Texas Instruments Incorporated, the owner of the present application, which is hereby incorporated by reference in its entirety herein, describes a method for increasing resolution using multiple SLMs. In this approach, the image to be displayed is divided into n sub-frames. The sub-frames are displayed simultaneously by projecting the sub-frames onto an image plane from multiple SLMs. The sub-frames are horizontally, or vertically, offset. By superposing the multiple sub-frames, the perceived resolution of the image is approximately twice the resolution (for a two SLM system) as for a single SLM system displaying the same image using the same SLM size.

In this prior known approach, an optical actuator is not required. Each of the SLMs can be commercially available SLMs (for example, DMDs from Texas Instruments Incorporated) and the increase in perceived resolution is thus achieved without the need for additional pixels in the SLM devices, and the system operates using the existing optical components. The image frame to be displayed is sampled and split into sub-frames with a horizontal, or vertical, offset. The two sub-frames are superposed and displayed simultaneously by displaying one sub-frame from one SLM and the other sub-frame from the other SLM at the same time. The resolution perceived by a viewer will be doubled in either a horizontal or vertical direction.

In another prior known approach, two SLMs are used with an offset in both horizontal and vertical directions. This approach is described in a European Patent Application EP 0790514 A2, published Aug. 20, 1997 and entitled "A method for displaying spatially offset images using spatial light modulator arrays," which is assigned to Texas Instruments Incorporated, the owner of the present application, and which is hereby incorporated in its entirety herein by reference. In this prior known approach, two spatial light modulators are used to produce an increased resolution display image from a lower resolution video input by projecting offset images that are offset in both the vertical and horizontal directions by a portion of a pixel pitch, such as ½ pixel diagonal. The image data is divided between the two SLMs so that the visible image has twice the resolution of a single SLM which is displaying the same image data.

While each of the prior known approaches has provided some improvement, further improvements are still desirable. A method for further accurately displaying very high resolution images in a projection system using existing SLM technology, while providing the higher resolution images to the viewer without visible artifacts, and without significant added costs, is therefore needed.

A continuing need thus exists to increase the resolution of the displayed image to accurately display high resolution video content, while maintaining or reducing system costs, and without increasing the size of the SLM devices or the optics in the system.

SUMMARY

Various aspects of the present application provide methods and apparatus for increasing the resolution in a system for image display using multiple spatial light modulators in optical projection. Novel methods are provided which include simultaneously projecting two offset optical images from two or more spatial light modulators onto a focal plane, the two sub-frame images offset diagonally from one another by less than a pixel diagonal, and the two sub-frame images displaying different color information on the two offset projected images, and subsequently swapping the positions of the two sub-frame images within offset image frame times that are less than a frame time, so that the image is refreshed at greater than a minimum rate. The visual resolution of the resulting image is increased over the resolution of the individual SLM devices due to the overlay of the offset sub-frame images that are displayed simultaneously. Filtering and de-convolution are performed on the sub-frame images to compensate for the overlay of the offset pixel areas and to prevent aliasing that would otherwise occur. In an alternative arrangement an optical actuator is also included.

In one aspect of the present application, a method for displaying images includes receiving video image data signal in a display system capable of displaying images, the video image data signal having a first resolution; forming from the video image data signal a first sub-frame image and a second sub-frame image, each of the first and second sub-frame images having a second resolution that is lower than the first resolution; for a first offset frame time that is less than a frame display time, simultaneously projecting a first color portion for the first sub-frame image and a second color portion for the second sub-frame image onto a focal plane; and for a second offset frame time that is less than the frame display time, simultaneously projecting a second color portion for the first sub-frame image and a first color portion for the second sub-frame onto the focal plane; wherein the first sub-frame and the second sub-frame are spatially offset by a diagonal offset distance that is less than a pixel pitch in the first and second sub-frames, and wherein the first color portion and the second color portion viewed together comprise the color information needed to view the video image in the first resolution and in color.

In another arrangement of the present application, a method for displaying images having increased visual resolution includes: providing an image projection system configured to simultaneously project a sub-frame image for each of at least two spatial light modulators onto a focal plane, each of the spatial light modulators having a resolution of at least X by Y pixels; receiving visual image data, the visual image data including at least red, green and blue color information at first image resolution greater than X by Y pixels; using the visual image data, forming an intermediate image having a resolution of approximately twice the resolution of X by Y pixels; forming an inverse filter configured to compensate for pixel overlap in the intermediate image; convolving the intermediate image with the inverse filter to form a compensated image; forming a sub-frame image for display at each of the at least two spatial light modulators by sampling the compensated image to form sub-images having a first color portion of the visual image data for each of the at least two spatial light modulators, the spatial light modulators each being configured to display different color portions of the visual image data; simultaneously projecting for a first offset frame time the sub-frame images for the first color portion on a focal plane, the sub-frame images spatially offset in a diagonal direction by a portion of a pixel pitch; and simultaneously projecting for a second offset frame time on the focal plane a second color portion for sub-frame images for each of the spatial light modulators, the sub-frame images viewed together forming an image having all of the color information of the visual image data and having an image resolution greater than or equal to the first image resolution.

In still another arrangement, a system for displaying a high resolution video image utilizing multiple spatial light modulators, includes at least one illumination source configured to provide red, green and blue illumination to multiple spatial light modulators; a video data image processor coupled to receive video image data at a first visual resolution of X by Y pixels; and multiple spatial light modulators each having an image resolution lower than the first visual resolution, each configured to project an image sub-frame onto a focal plane using an image projection system; wherein the image projection system is configured to project a first sub-frame image of a first color portion of the first visual resolution image onto the focal plane while simultaneously projecting at least a second sub-frame image of a second color portion of the first visual resolution image onto the focal plane, and the first and second sub-frame images are offset in a diagonal direction from one another, so that when viewed together the viewed image has the first visual resolution.

In still another arrangement the forms an additional aspect of the present application, a system for projecting images includes at least one illumination source for providing color illumination; illumination optics receiving light from the illumination source and performing a polarization of the light corresponding to multiple spatial light modulators; RTIR prisms for receiving polarized light form the illumination optics and directing the light onto a corresponding one of the multiple spatial light modulators; a polarized beam splitter positioned to receive reflected polarized light from multiple spatial light modulators and to direct the polarized light into a projection system; wherein the projection system projects an image comprising multiple spatially offset sub-images that form a viewable image having a resolution higher than the resolution of the spatial light modulators.

Recognition is made in aspects of this application of solutions for providing an image display system having increased display resolution using lower resolution SLM components. The novel methods and apparatus disclosed enable the use of lower cost components and provide a high resolution image without the problems associated with the prior known solutions, thereby advantageously enabling the use of higher resolution video systems at reduced cost.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Figure 1:
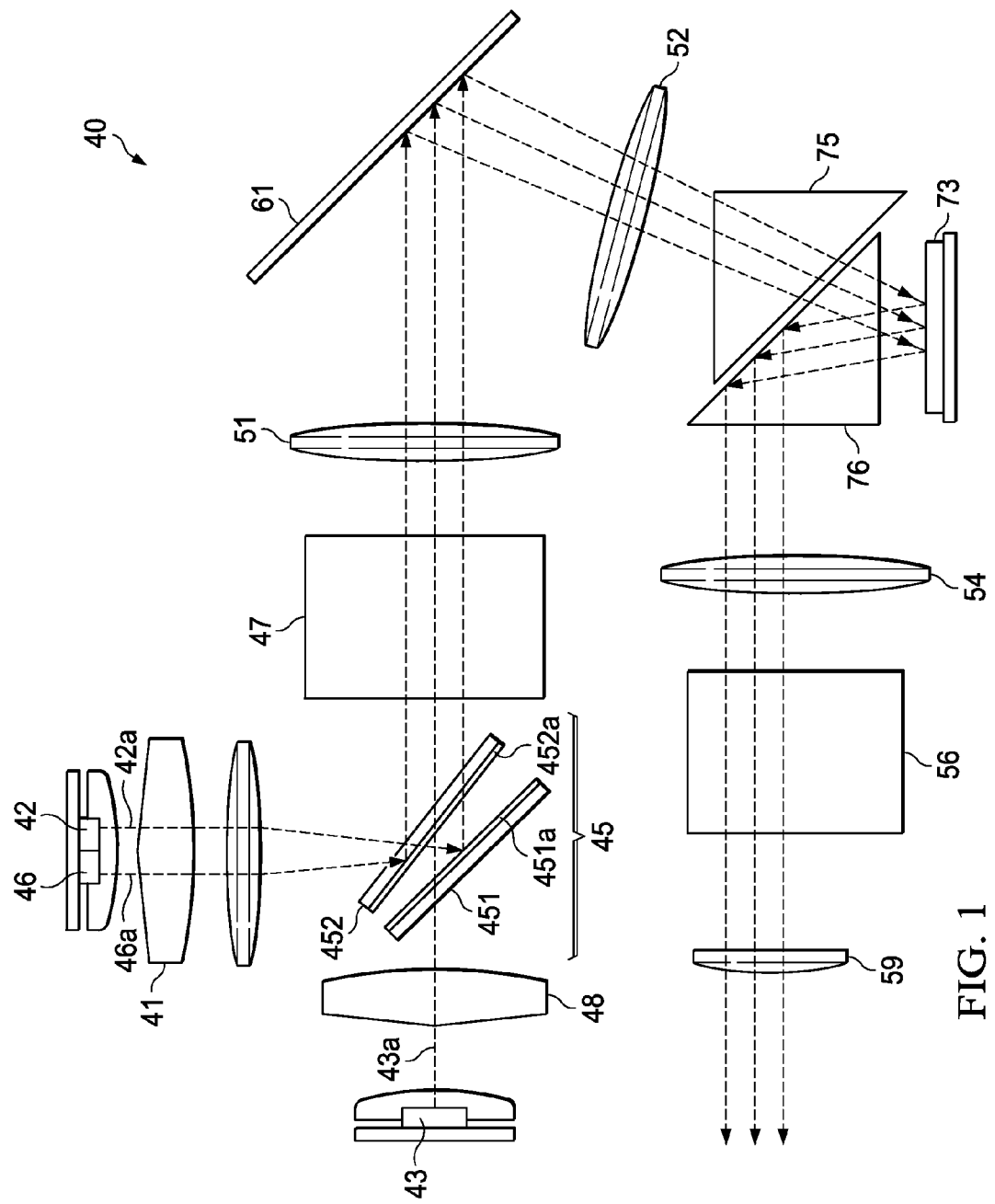
FIG. 1 illustrates in a simplified block diagram a conventional optical projection system illustrated for describing various aspects of the present application.

The making and using of example illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, or the scope of the appended claims.

For example, when the term "coupled" is used herein to describe the relationships between elements, the term as used in the specification and the appended claims is to be interpreted broadly, and is not to be limited to "connected" or "directly connected" but instead the term "coupled" may include connections made with intervening elements, and additional elements and various connections may be used between any elements that are "coupled."

In various aspects of the present application, novel solutions are provided for displaying video content having increased resolution in an imaging system using SLMs, yet without the need for correspondingly increasing the physical size or the total pixel count within the SLM devices. In certain aspects of the present application, multiple SLMs are used to display an image at a certain high resolution by displaying two or sub-frames at a lower resolution, simultaneously projecting the sub-frames at a focal plane. The sub-frame images are divided from the visual image data and differ from one another in terms of chrominance and are simultaneously displayed with a spatial offset in a diagonal direction from one another by at least a portion of a pixel area, for example by ½ the pixel diagonal, but not limited to that example offset. In order to provide the complete color image to the viewer, the offset sub-frame images are swapped after an offset frame time within the image frame time. The offset frame time and the swapped offset frame time are chosen to be at a minimum frequency that is sufficiently high to allow for the correct color content for the entire high resolution image to appear to the viewer. Because the human visual system is less sensitive to shifts in chrominance than to shifts in luminance, the higher resolution image is visually sharp to the viewer without temporal aliasing or of other visible aliasing or artifacts. Further, by shifting the two sub-frames diagonally, a direction that the human visual system is less sensitive to than shifts in either the horizontal or vertical directions used in certain prior known approaches, additional perceived image quality is achieved when compared to prior known approaches. In the novel methods, signal processing steps are performed to account for the overlap that occurs between pixels in the superposed image, and in certain arrangements an anti-aliasing process is applied to prevent aliasing effects that might otherwise occur in the displayed image.

For further understanding of the operations of a known image projector system using a single spatial light modulator, FIG. 1 depicts in a system block diagram a top view or plan view of a conventional image projection system 40. System 40 is a prior known DLP projection system configured using conventional reverse total internal reflection (RTIR) projection architecture. In an RTIR image projector architecture, a reverse total internal reflection (RTIR) prism is used in a projection path between a spatial light modulator and the projection optics, as is further described below.

In the projection system 40, illumination is provided as shown as provided by the use of red, green and blue (RGB) LEDs 42, 43 and 46. However, this is but one example and alternative illumination sources can also be used, such as incandescent lamps with reflectors, single lamps with color wheels, lasers, laser-phosphor illumination, and the like. The LEDs can include an optical coating or collimating optics 41 and 48 which act to collect and collimate the light output by the LEDs. Other colors can also be used. Also, as illustrated in FIG. 1, two LEDs 42 and 46 are shown on a single integrated device, these can be the red and green LED devices, for example, while the blue LED 43 is provided as a separate component. In alternative systems three individual LEDs are used, and in one arrangement, two dichroic plates in the form of an X shape can be used to combine the three colors (RGB) into an illumination source. In additional arrangements a sequential path of dichroic filters can be used with one corresponding to each LED.

In the particular example shown in FIG. 1, a pair of dichroic elements 451, 452 are used to form a "fan" dichroic element 45. The two elements each have a corresponding dichroic film or plate 451a, 452a that reflects or transmits light. The dichroic plates are arranged so that they are not in parallel, enabling the transmission and reflection of the light beams 43a, 42a, and 46a to the illumination path. In FIG. 1, the light from LED 43, labeled 43a, is transmitted through both the dichroic element 451, and element 452, of fan dichroic 45. A dichroic film 451a reflects the light from the LED 42, labeled 42a, and passes the light from blue LED 43 through and to the illumination path, so that is transmitted through the dichroic element 452, reflected at dichroic film 451a of dichroic element 451, and the transmitted through dichroic element 452 a second time. The dichroic film 452a on element 452 transmits the light from LED 42 and from LED 43, but reflects the light from LED 46, labeled 46a, into the illumination path. Note that in alternative arrangements, many LEDs can be used or multiple LEDs can be used instead of one LED for each color.

The use of the three LEDs 42, 43, and 46 illustrate one possible approach for three color projection. Another approach is to use a color wheel with a white light source. Laser-phosphor illumination systems can be used as well, for example a single blue laser can be used with a phosphor color wheel to provide red, green and blue colors. A laser incident on a yellow phosphor can be used to output yellow, for example. Alternative color schemes include cyan, magenta, yellow and white on color wheels and six color wheels with red, green, blue, cyan, magenta and yellow portions.

In FIG. 1, a light uniformity device or integrator 47 is placed in the illumination path after the fan dichroic 45. The integrator 47 may be a "fly's-eye" integrator (also referred to as a lens array), or a rod integrator or tube integrator. The integrator produces a more homogeneous light beam which can then be transmitted through one or more relay lenses such as relay 51. The relay optics such as 51 extend the length of the illumination path.

Mirror 61 is provided and in this particular example arrangement, folds the illumination light path. This reflective fold mirror also enables the illumination light rays to reach the spatial light modulator 73 (which in this example is shown implemented by a digital micro-mirror device or "DMD") at an angle. Because the digital micro-mirror (DMD) 73 modulates the light by tilting reflective mirrors, the illumination rays must strike the mirrors at an angle. Use of the folding mirror 61 makes control of the angle the illumination rays follow to the reflective spatial light modulator 73 easier to achieve. Additional relay optics such as 52 can be placed between the mirror 61 and the DMD 73. In alternative arrangements, another type of spatial light modulator can be used instead of DMD 73, for example a liquid crystal on silicon (LCoS) device can be used.

Use of a reflective spatial light modulator (such as DMD 73) requires that the illumination light rays from the mirror 61 that are entering the DMD package 73 and the reflected image light rays leaving the mirrors in the DMD 73 be physically separated to avoid interference, as can be seen by examining FIG. 1. As is known to those of skill in the relevant arts, the use of a TIR/RTIR prism can separate the incoming light rays from an illumination system from the reflected image rays that are being transmitted into the projection optics. U.S. Pat. No. 5,309,188, entitled "Coupling Prism Assembly and Projection System Using Same," which is hereby incorporated by reference in its entirety herein, discloses a prism arrangement using total internal reflection to separate the illumination light path and projection light path in a small space. As shown in FIG. 1, wedge prism 75 and TIR prism 76 form a RTIR coupling prism that accomplishes the needed separation of the illumination light rays from the image light rays. The image light rays exit prism 76 and are coupled into a projection system that includes elements 54, 56, and 59.

As described above, in order to accurately display an image of very high resolution projected by the single SLM image display system such as system 40 in FIG. 1, the prior known approaches require the use of increasingly larger and more expensive SLM devices, with corresponding increases in system complexity to provide the additional data needed to modulate the image, and corresponding increases in cost to create the optical elements needed for the larger size image path.

Figure 2:
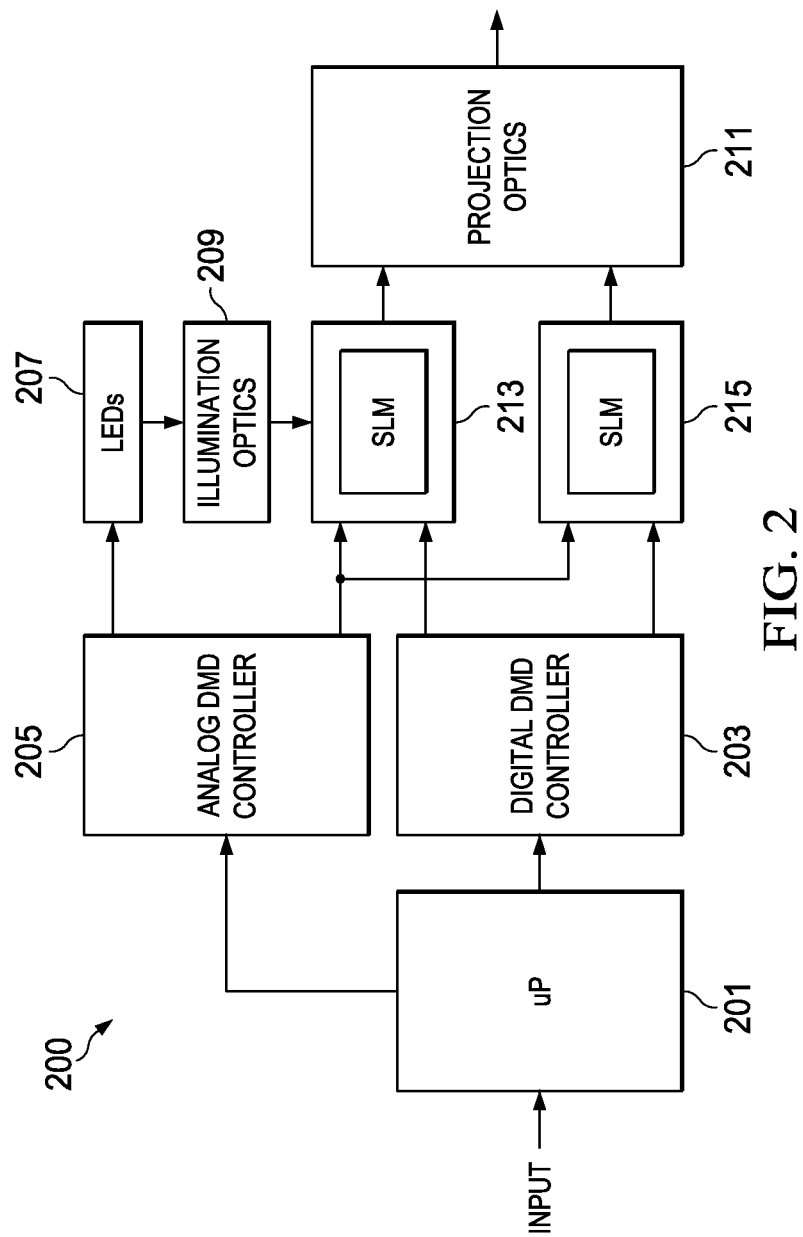
FIG. 2 illustrates in simplified block diagram an arrangement for a projection system using multiple spatial light modulators for describing aspects of the present application.

FIG. 2 illustrates, in a simple block diagram, an example system 200 incorporating certain aspects of the present application. In FIG. 2, electrical components are shown used in implementing an image projection system. Digital video image data "INPUT" is input for display to a processor such as a microprocessor 201 (labeled "µP"). An analog DMD controller system 205 receives control signals from the microprocessor 201 and controls LEDs 207, for example red, green and blue LEDs. Alternative illumination systems can be used, including lasers and phosphor wheels, and color wheels with incandescent lamps. An illumination optics system 209 may be arranged generally to form an illumination beam using dichroics as discussed with respect to FIG. 1, above, the dichroics provided to transmit the red, blue and green rays. Various optical components are also provided in a projection optics system 211 that as shown receives the image light rays from a pair of spatial light modulators 213, 215, and projects them outwards from the optics system 211 for display.

In FIG. 2, a digital DMD controller 203 receives video image data from the microprocessor 201 and controls the modulation of light at the spatial light modulators 213, 215 to create two sub-images from the video image data. In a novel approach that is an aspect of the present application, the sub-images are formed by sampling the image data to form lower resolution sub-images. In an aspect of the present application the sub-images are formed using chrominance information from the video data image. Each sub-image displays a portion of the original video image at a lower resolution than the original video image, and each sub-image is displayed simultaneously from one of the spatial light modulators 213, 215. After the first two sub-images are displayed for an offset frame time that is less than an image frame time, the two sub-images are swapped in terms of chrominance and again displayed simultaneously for a second offset frame time. Importantly the two sub-images overlap and are displayed with a diagonal offset one from the other, so that after the two offset frame times elapse, all of the color information in the video data image for a particular frame is presented, and by using two spatial light modulators, the displayed image that is perceived at the focal plane by a human observer is a visual image with the original (higher) image resolution, the result of superposing the two sub-images in two offset frame periods. In this manner the system 200 creates an image for each frame that has a higher visual resolution from two spatial light modulators such as 213, 215 of a lower resolution. In some arrangements of the present application, a shared illumination system is used and the two sub-images are projected in a time interleaved fashion. In additional alternative arrangements, independent illumination for each SLM is provided, and the two sub-images can be projected simultaneously, increasing the brightness of the projected superposed image.

Figure 3A:
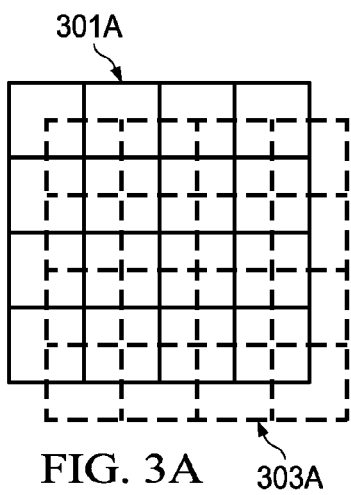
FIGS. 3A and 3B illustrates in a simplified diagram an example operation of arrangements of the present application.
Figure 3B:
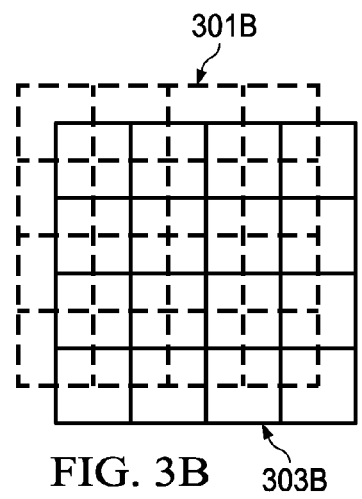

FIGS. 3A and 3B illustrate the operation of the system in FIG. 2 in contemporaneously projecting the two overlapping sub-images during the two offset frame periods. In FIG. 3A a first pair of sub-images is projected at a focal plane. Sub-image 301A can be one produced at one of the spatial light modulators using, for example, only green color information from the original video image data. Sub-image 303A can be produced at another spatial light modulator such as 215 or at more than one spatial light modulator using, for example, blue and red information from the original video data image. In an aspect of the present application, the color information in the sub-images is selected to keep the luminance difference between the two sub-images low. The human visual system is sensitive to luminance shifts, more so than it is for chrominance shifts, and the arrangements that form aspects of the present application are selected to take advantage of this characteristic of the human visual system. While the two sub-images 301A, 303A are simultaneously viewed for a first offset frame time, the two sub-images are also offset diagonally by a portion of a pixel area. That is the second sub-image is projected to be viewed at a position shifted from the first sub-image in both the horizontal and vertical directions to create a diagonal offset in the pixel areas. This feature is important to certain arrangements of the present application because the single diagonal shift increases horizontal and vertical resolution in the system.

In FIG. 3B, two sub-images 301B and 303B are displayed using the diagonal overlap but with a swap in chrominance. This can be accomplished, for example, using dual illumination systems to now display blue and green on the spatial light modulator that projects the sub-image 301B, and to display red on the spatial light modulator, or a pair of spatial light modulators, that project the sub-image 303B. The two display images shown in FIGS. 3A and 3B are each displayed for an offset frame time that is a portion of a display frame time, for example, if the display time is 10 milliseconds, the offset frame times can be evenly divided into 5 millisecond offset frame times. Because the total information displayed includes all three input colors that match the rods and cones of the human visual system, and because the sub-images provide a display resolution together that is at least as high as the original video image resolution, the lower resolution SLM devices have been used in the arrangements of FIGS. 2 and 3 to display the higher resolution image. By utilizing signal processing arrangements as described below to form the two sub-images, the displayed image is also viewed without temporal aliasing effects.

Figure 4A:
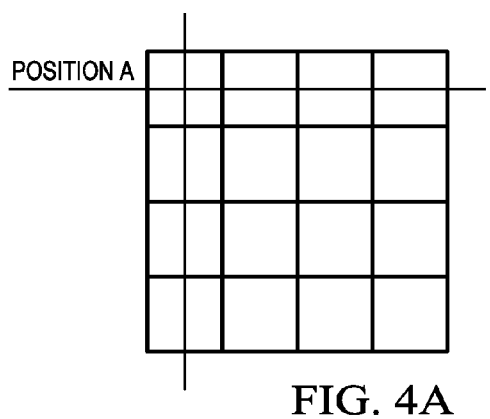
FIGS. 4A and 4B illustrate in a simplified diagram a sequence of operations of arrangements of the present application.
Figure 4B:
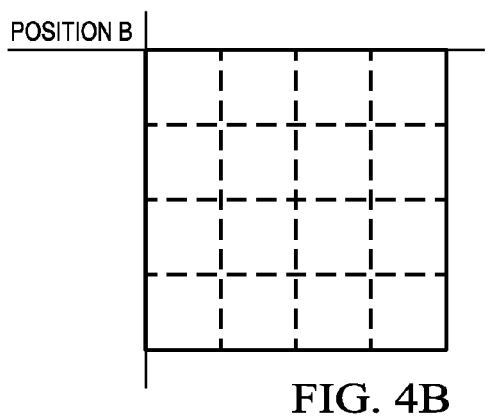

FIGS. 4A and 4B illustrate the two static sub-image positions used in an example arrangement that forms an aspect of the present application. In FIGS. 4*a* and 4B the two positions are illustrated that would be displayed together to form a single offset frame time image. FIG. 4A depicts the sub-image from a first spatial light modulator; and FIG. 4B illustrates the sub-image from a second spatial light modulator, the dashed lines indicate colors such as green and blue in FIG. 4B, and the solid line illustrates a different color, red, in FIG. 4A. When the image is displayed for viewing, the two sub-images are projected onto a focal plane where the viewer observes the superposed images displayed together. After a first portion of a frame time, the offset frame time, the colors will be swapped and the two static positions will display image information that is also spatially offset but has different colors, for example the solid line in FIG. 4A would then represent blue and green in the swapped offset frame time, while the dashed line in FIG. 4B will represent red in the swapped offset frame time. The two positions would be displayed for portions of a frame display time so that when the sub-image display times for an image are added together the total time is less than or equal to a frame display time for the selected frame of high resolution image data. Each spatial light modulator will cycle through the colors for the sub-frame corresponding to that sub-image; in addition to red, green and blue, additional colors can be used such as magenta, cyan, yellow, white, and others.

Figure 5:
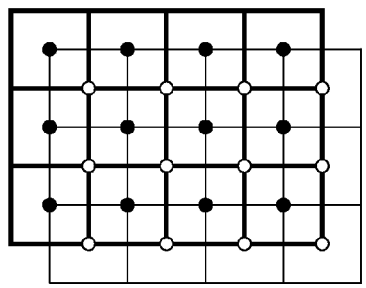
FIG. 5 illustrates in a simplified diagram an operation of arrangements of the present application in projecting overlapping sub-images.

FIG. 5 depicts, in a simple illustration of the superposed sub-images, the pixel overlap that occurs in the superposed image. In FIG. 5 the pixel centers are shown as circular shapes, and the pixel areas are shown as square borders. In order to utilize the arrangements described above, filters are applied to the input video signals to compensate for optical blurring that would otherwise occur when the two sub-images are superposed for display. The optical blurring occurs due to the overlap that occurs between pixel areas as seen in FIG. 5. The pixel area overlap can be modeled and can be compensated for using an inverse filter and a convolution operation.

FIG. 5 illustrates the pattern of overlap that occurs in the displayed images. The pattern illustrates how the center positions of the integrated pixels are arranged and indicates the amount of pixel overlap. Because of the pixel overlap and the spatial offset of the two sub-images, the input image has to be subjected to signal processing prior to the sampling of the two sub-images for display, otherwise the displayed image will be optically blurred by the pixel overlap.

Figure 6:
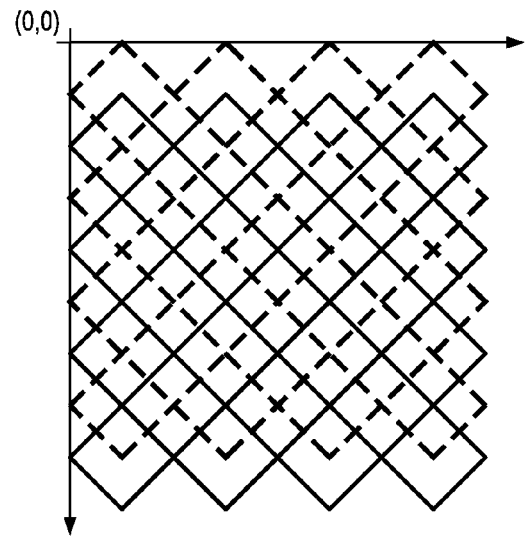
FIG. 6 illustrates in a simplified diagram an operation of alternative arrangements of the present application in projecting overlapping sub-images in a diamond orientation.

FIG. 6 illustrates an alternative arrangement where a static offset of two sub-images is used with a diamond pixel arrangement in a ½ pixel offset arrangement. This arrangement is contemplated as an additional aspect of the present application. Using the diamond pixel arrangement can further enhance the quality of the viewed image as the frequency content of the diamond arrangement pixels is increased over the Manhattan arrangements shown above. The operation of the arrangements is generally the same as described above. The operation of the projection systems and the signal processing using the diamond arrangement for the spatial light modulators and the resulting sub-images is similar to that described above for the Manhattan arrangement.

In operation, for a given number of pixels, a diamond arrangement gives higher horizontal and vertical frequency content than the same number of pixels with an orthogonal or Manhattan arrangement. The diamond arrangement is optimal because the human visual system is more discerning of horizontal and vertical structures than of diagonal ones.

Figure 7A:
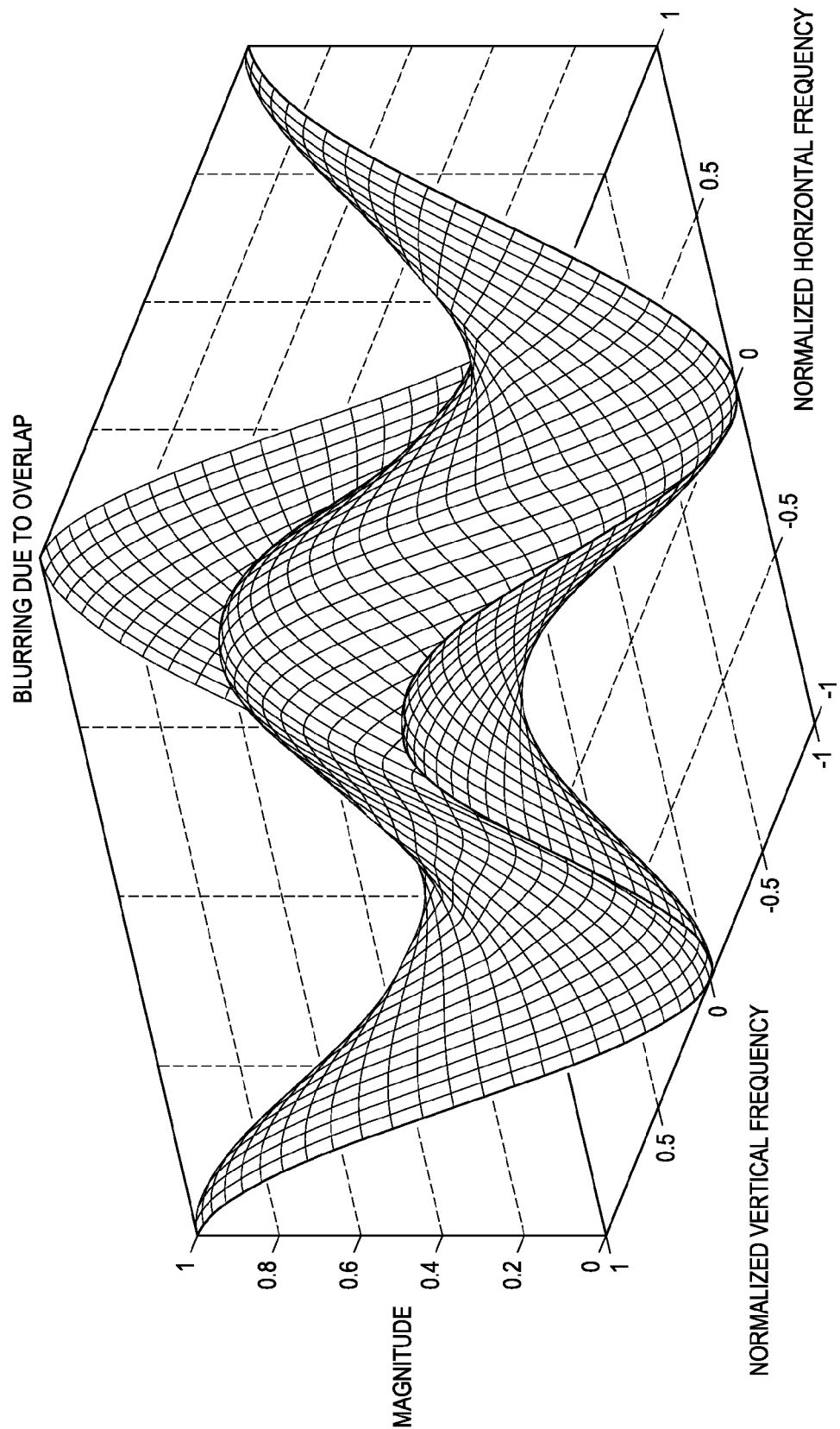
FIGS. 7A-7C illustrate in graphs the frequency response for an arrangement using overlapping sub-images, for an inverse filter to compensate for blurring, and the result of a convolution.
Figure 7B:
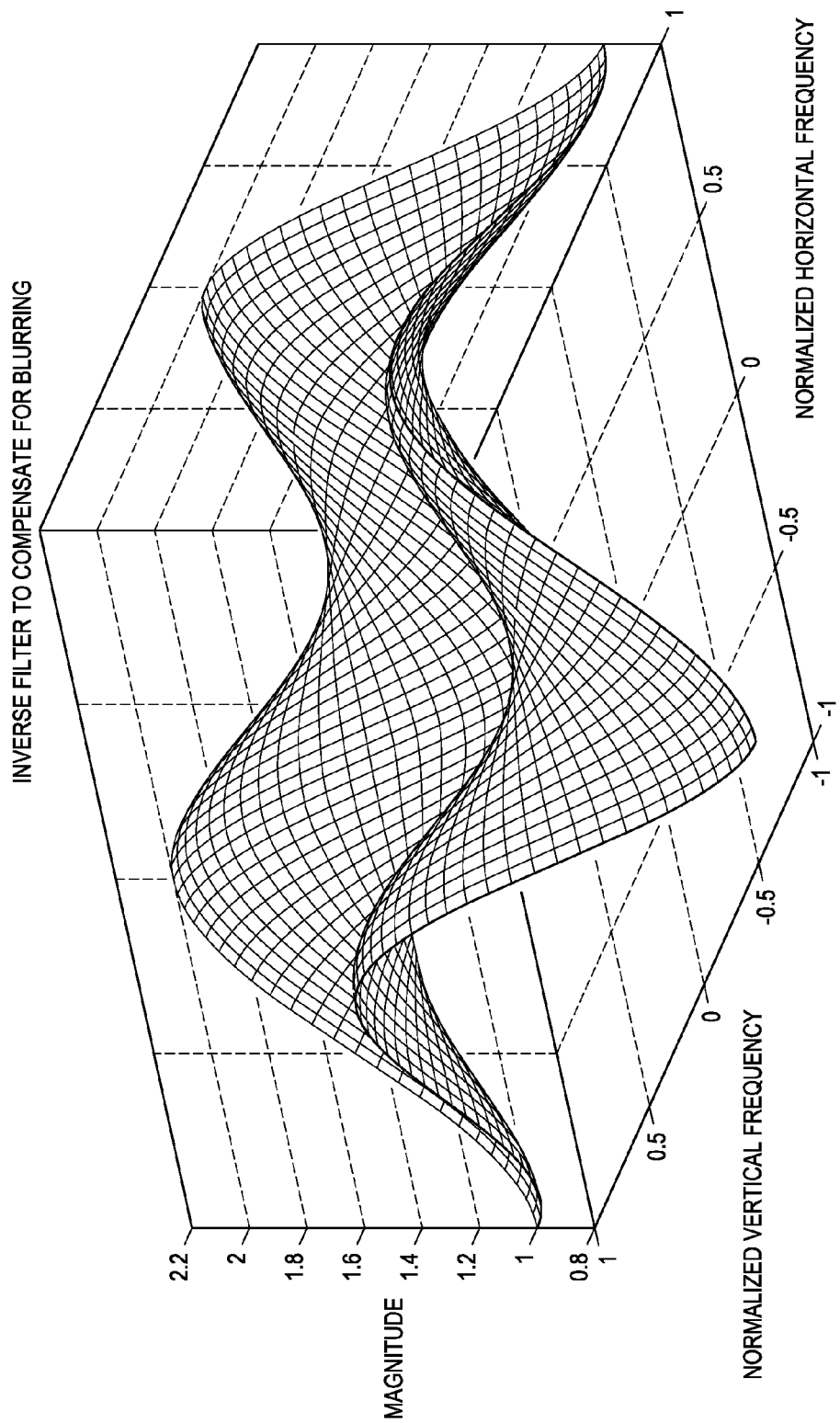
Figure 7C:
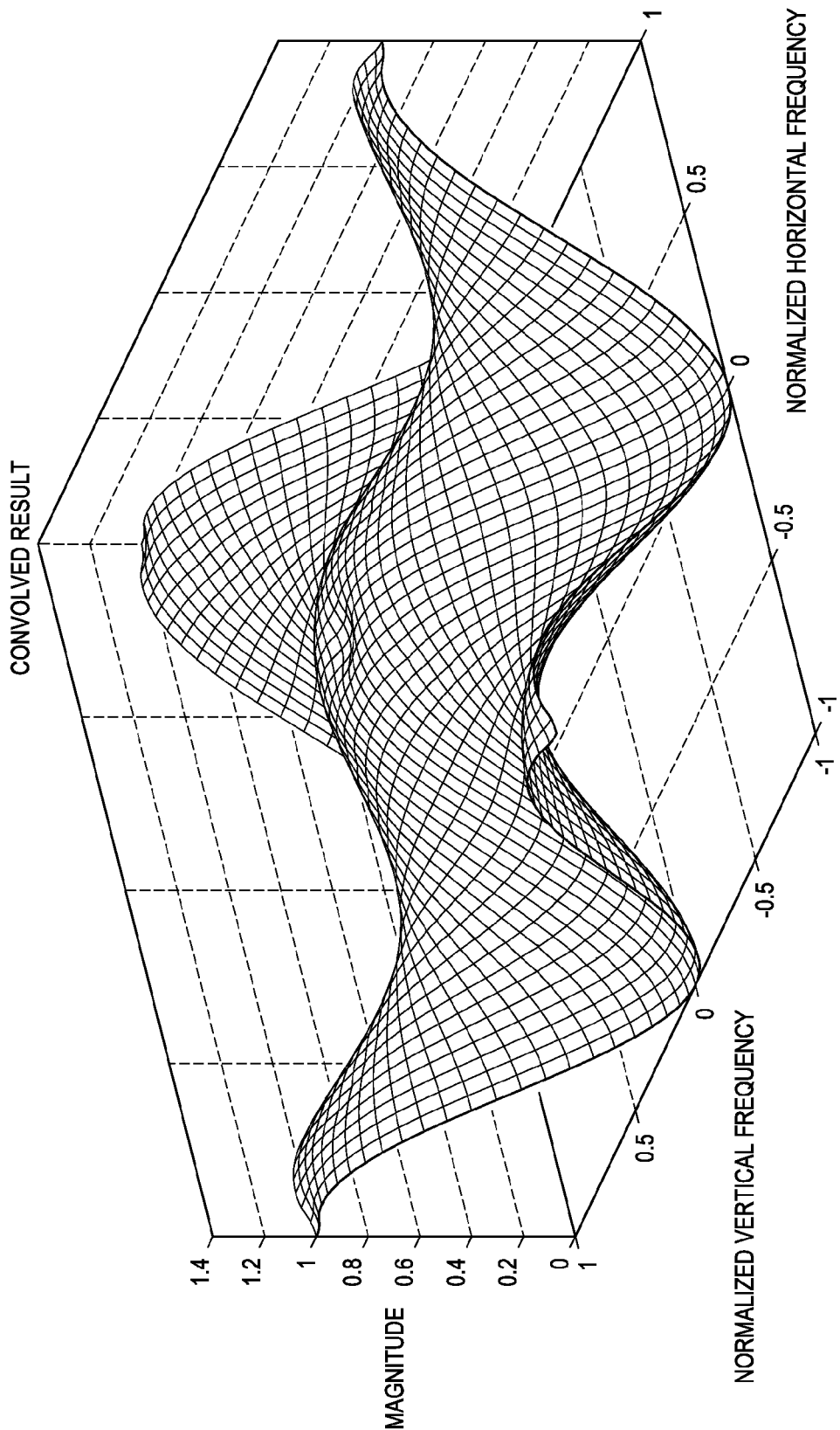

FIGS. 7A, 7B, 7C depict, respectively, in graphs of magnitude v. frequency the frequency content of the incoming video signals with the effect of the sub-image overlap in FIG. 7A, an inverse filter formed for a convolution designed to compensate the video signal in FIG. 7B, and the resulting convolved result that is used for display without the optical blurring in FIG. 7C. In FIG. 7A, the frequency graph depicts the blurring effect of overlapped pixels, in FIG. 7B, an inverse filter function created to compensate the video signal shown in FIG. 7A is illustrated, and in FIG. 7C, the result of convolving the video signal as shown in FIG. 7A with the filter function in FIG. 7B is shown. The convolved result is thus compensated for the optical blurring by the convolution of the input signal shown in FIG. 7A with the inverse filter of FIG. 7B.

As shown in FIGS. 7A-7C, optical blurring is compensated for by applying an inverse filter to the video data stream. For 100% fill factor, optical blurring is adequately modeled by the following example 2D Finite Impulse Response (FIR) filter:

$$\text{System} = \begin{matrix} \frac{1}{8} & 0 & \frac{1}{8} \\ 0 & \frac{1}{2} & 0 \\ \frac{1}{8} & 0 & \frac{1}{8} \end{matrix} \quad \text{(Equation 1)}$$

As shown in FIG. 7A, the pixel overlap occurs in the areas where the magnitude is non-zero in the FIR filter of Equation 1.

An example inverse filter designed to compensate for the FIR filter in Equation 1 is as follows:

$$\text{Inverse} = \begin{matrix} -.0029 & 0 & -.0139 & 0 & -.0029 \\ 0 & -.1283 & 0 & -.1283 & 0 \\ .0139 & 0 & 1.5805 & 0 & -.0139 \\ 0 & -.1283 & 0 & -.1283 & 0 \\ -.0029 & 0 & -.0139 & 0 & -.0029 \end{matrix} \quad \text{(Equation 2)}$$

The frequency response of the optical system, the inverse filter, in Equation 2, and convolved result is are shown in FIGS. 7A, 7B and 7C above.

In addition, further signal processing can be performed to prevent aliasing. An anti-aliasing filter is applied to the video frame information. The anti-aliasing processing is to account for the fact that the integrated positions of the two or more SLMs used in the superposed images have shifted from an orthogonal or "Manhattan" sampling lattice to a quincunx sampling lattice, as can be seen by examining FIG. 5, above. In the arrangements of the present application, a diamond pass-band filter is applied to the video data stream, and the results are then sub-sampled to form the sub-images.

Figure 8A:
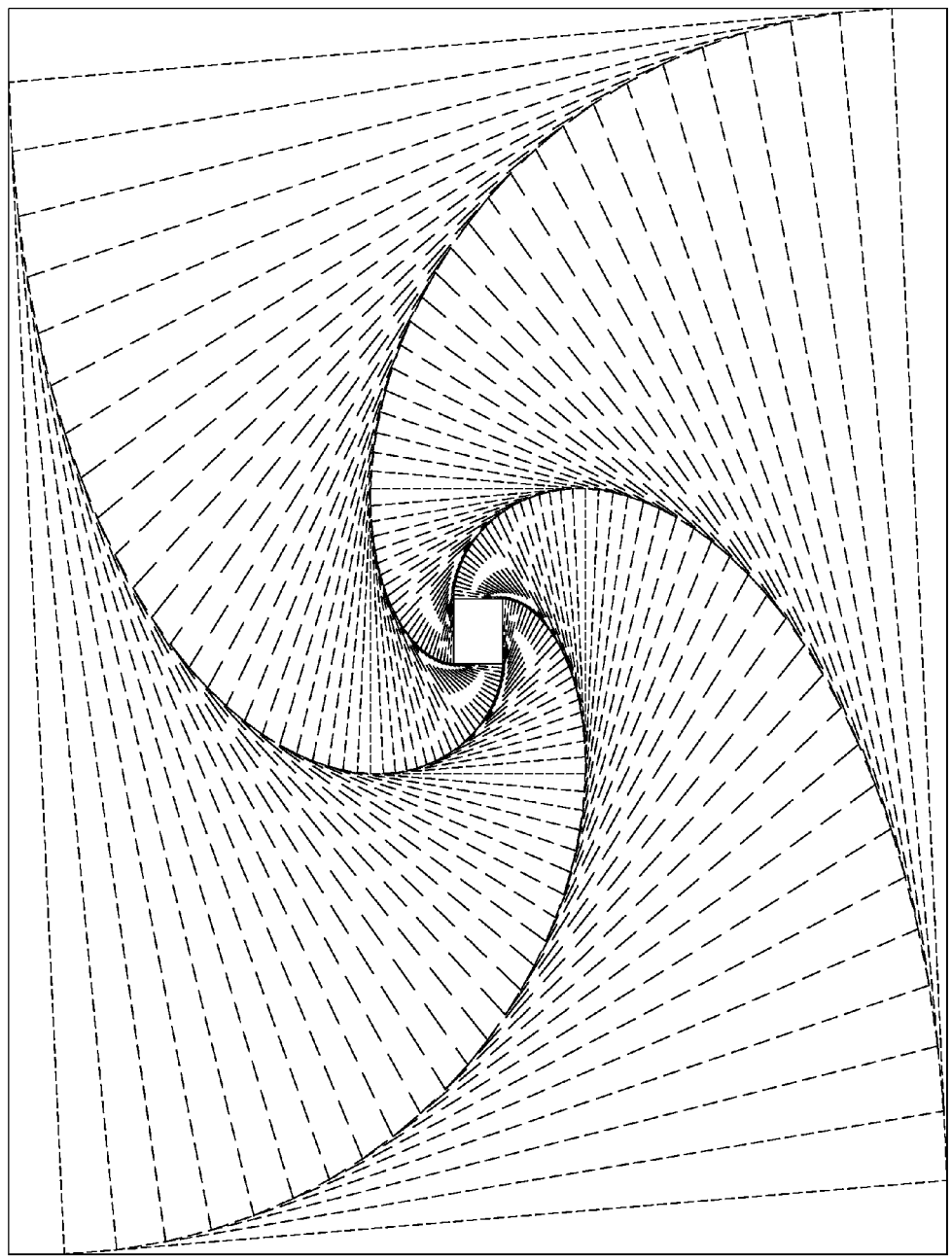
FIGS. 8A-8B illustrate the effects of an anti-aliasing operation of the arrangements using sample images.
Figure 8B:
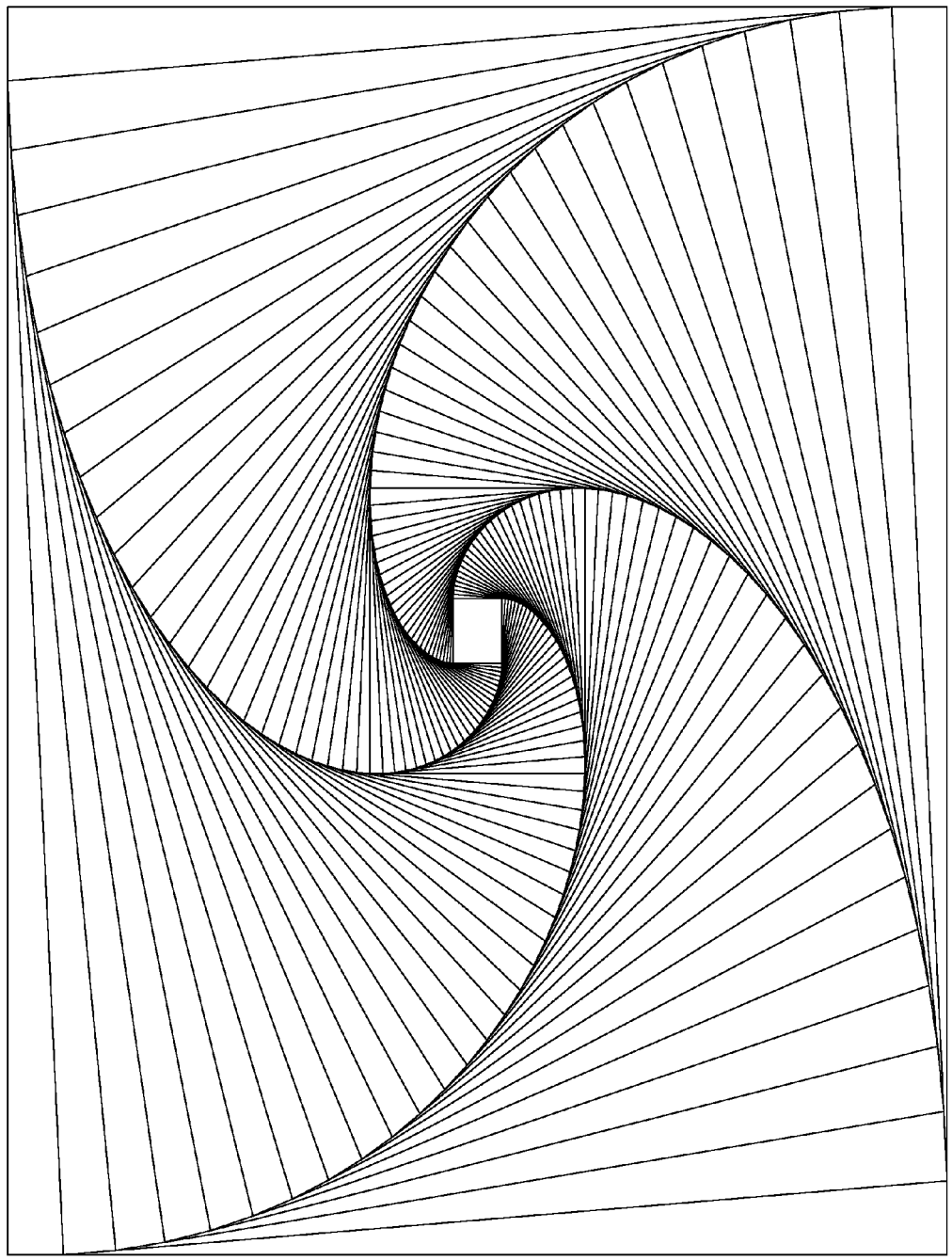

FIGS. 8A and 8B illustrate the importance of the anti-aliasing filtering in the arrangements that form aspects of the present application. In FIG. 8A, a two dimensional image is shown projected using two 1080 p SLMs to form the image from sub-images sampled from a UHD resolution input. As can be seen in FIG. 8A, certain features are not reproduced accurately, such as the broken lines. This indicates aliasing is occurring and as a result the superposed image observed by a human viewer is incorrectly reproduced.

FIG. 8B illustrates the same UHD resolution input image displayed using two 1080 p SLMs with spatial offset, and with the anti-aliasing filtering applied. As can be seen by comparing the two FIGS. 8A and 8B, the aliasing effects visible in FIG. 8A are now removed and the high resolution image is correctly reproduced as observed by a human viewer.

Figure 9:
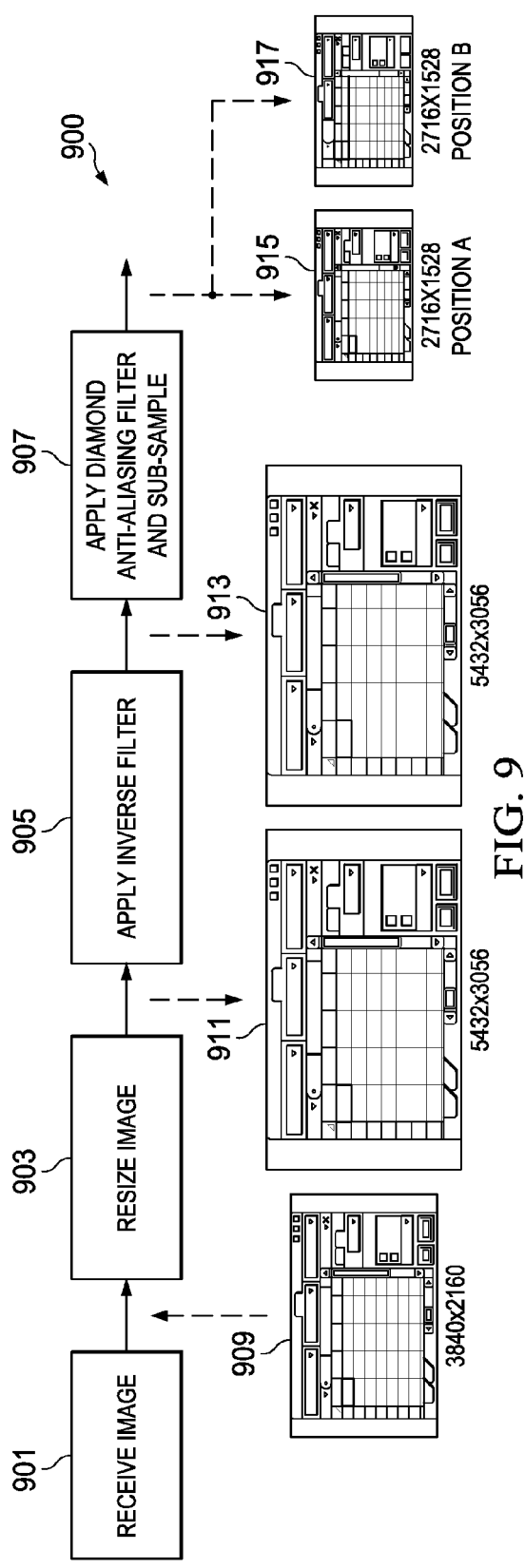
FIG. 9 illustrates in a block diagram an arrangement of the present application for forming sub-images.

FIG. 9 depicts in a block diagram a system 900 illustrating an example implementation for an arrangement that forms an aspect of the present application. The functional blocks 901, 903, 905, 907 of FIG. 9 can be implemented in a variety of ways. For example, the blocks 901, 903, 905, 907 and their corresponding functions can be implemented by using a programmable signal processor and by providing executable code to perform the described functions, or by providing dedicated hardware designed to perform the functions, or by using user programmable logic arrays such as FPGAs and CPLDs, or by designing one or more dedicated integrated circuits such as ASIC devices, or by fabricating custom integrated circuits that include signal processors, code storage, memory devices, and hardware portions designed in particular for selected functions. Each of these alternative implementations is contemplated by the inventors as forming an alternative arrangement of the present application and is within the scope of the appended claims.

FIG. 9 illustrates an arrangement for processing a high resolution video image for display using the multiple spatial light modulators as described above. In FIG. 9, the data processing begins at block 901, labeled "Receive Image", where an incoming high resolution image is received. In an illustrative example a UHD resolution image is received, shown as 909 in FIG. 9. This UHD image has a resolution of 3840 by 2160 pixel positions, or 8,294,400 pixels. The received image data is processed and the received image is increased to a double size image for processing in block 803 labeled "Resize Image", in an example for processing a UHD image, this results in a resized image such as 911 in FIG. 9 having a size of 5432 by 3056 pixels or 16,600,192 pixels. Note that this example is not limiting, and other resolutions can be displayed by varying the sizes and resolution of the sub-image SLMs. For example, 8K resolution devices are currently being developed. These devices will use video with 16 times the resolution of HDTV or 1080 p, and the arrangements described herein can be applied to display 8K video as well as 4K or UHD video in the example. Other high resolution video can also be displayed using lower resolution spatial light modulators by applying the arrangements and methods described herein, and these variations are contemplated by the inventor as additional aspects of the present application and fall within the scope of the appended claims.

Again referring to FIG. 9, block 905 labeled "Apply Inverse Filter" performs an inverse filter function to compensate for the overlap in the two sub-images that will be formed, such as is described above and illustrated in FIGS. 7A, 7B, and 7C. The output image is shown in FIG. 9 as image 913. A diamond pass band filter is then applied to the video data stream to perform the anti-aliasing filtering as is described above. Block 907 receives the convoluted data image from block 905 and applies anti-aliasing filtering, and then, forms two smaller sub-images by sub-sampling the image data. As described above, the anti-aliasing step is performed because the integrated positions of the multiple SLMs in the system now lie on a quincunx sampling lattice. At step 907 the processed video data is now also sub-sampled to form two spatially offset sub-images, each having the resolution of a lower resolution SLM used in the system. For example, in an example application the 2 sub-images 915 and 917 are in arrays of 2716 by 1528, or 4,165,328 pixels for each sub-image. Since the two sub-images are displayed simultaneously, the total resolution of the superposed image displayed is 8,330,656 pixels, providing slightly more than the original high resolution image of 8,294,400 pixels. In this manner the use of the multiple SLMs with simultaneous display of the two sub-images enables the accurate display of the high or ultra-high resolution video content at full image resolution while yet using SLMs of lower resolution. In sharp contrast to prior known approaches, interpolation is not used to display the images, instead in the arrangements herein the highest horizontal and vertical frequency content will be visible to the viewer to provide high resolution images.

Figure 10:
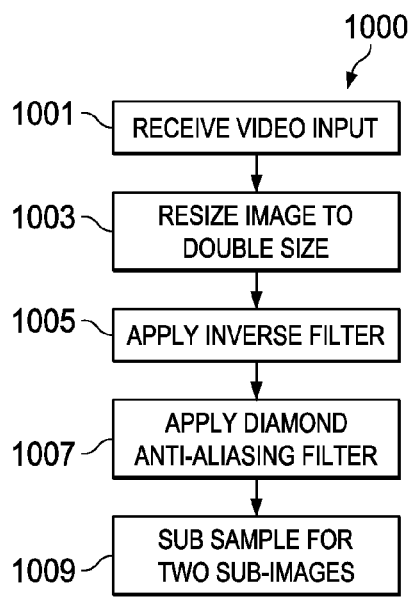
FIG. 10 illustrates in a flow diagram a method arrangement incorporating additional aspects of the present application.

FIG. 10 illustrates in a flow diagram a method arrangement for displaying high resolution images using multiple SLMs of lower resolution. In FIG. 10, the method begins at step 1001. In step 1001, labeled "RECEIVE VIDEO INPUT", the high resolution image is received. At step 1003, "RESIZE IMAGE TO DOUBLE SIZE", the method continues by resizing the image to a double sized image. In an example where the input image is 3840×2160 pixels, or a UHD resolution image, the double sized image is 5432×3056 pixels, or 16,600,192. At step 1005, "APPLY INVERSE FILTER", the inverse filter is applied to the double sized image by a de-convolution operation to remove the effects of the overlap in pixel areas as described above. At step 1007, "APPLY DIAMOND ANTI-ALIASING FILTER", the diamond anti-aliasing filter is applied to remove aliasing affects. At step 1009, "SUB SAMPLE FOR TWO SUB-IMAGES", the image is sub sampled to form two images, one for each of the spatial light modulators used to display the two sub-images. The two sub-images are, in the example above, each 2716×1528 pixels, dividing the resized image into two. The two sub-images are now ready for display by the two spatial light modulators in an offset to project the high resolution image.

Figure 11:
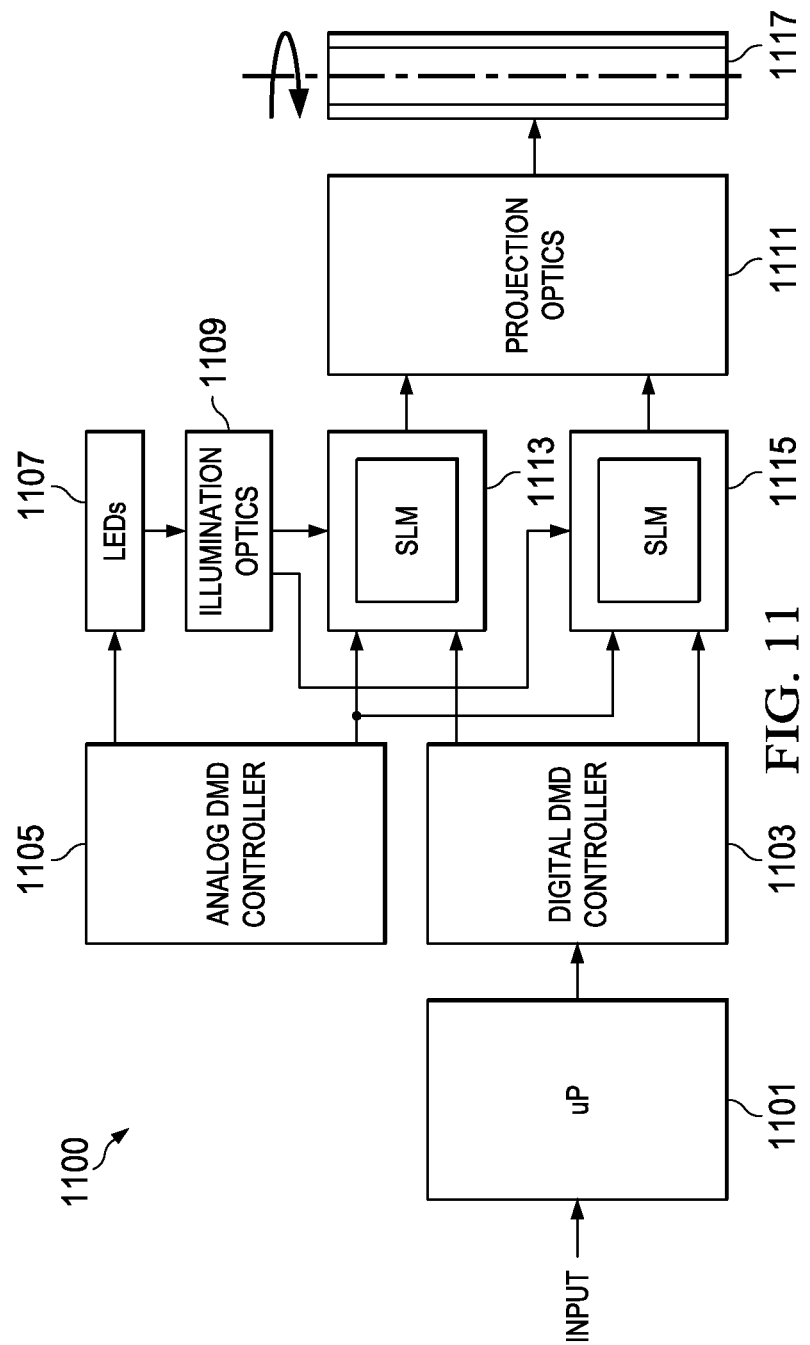
FIG. 11 illustrates in a simplified block diagram an arrangement for a projection system incorporating additional aspects of the present application.

FIG. 11 illustrates in an alternative arrangement a system 1100 for displaying images using multiple SLMs to form four sub-images from sub-images projected onto two or more SLMs. A digital video input signal is input to a microprocessor µP 1101. The microprocessor 1101 is coupled to a digital DMD controller integrated circuit, ASIC, or module 1103, which controls the image modulation of the SLMs. The analog DMD controller 1105 controls the illumination source 1107 and illumination optics 1109 to direct illumination light such as red, green and blue colored light on to the SLMs 1113, 1115. The light reflected from the SLMs 1113, 1115, which can be implemented using DMDs, LCoS or other SLM technology, is directed into a set of projection optics 1111. An optical actuator 1117 is used to move the sub-images projected by the SLMs in two positions. By aligning the SLMs to two initial positions that are spatially offset by a portion of a pixel area in a diagonal direction, and by further using the optical actuator 1117 to move the sub-images into two additional positions, a total of four overlapping sub-images can be displayed.

Figures 12A, 12B, 12C, 12D:
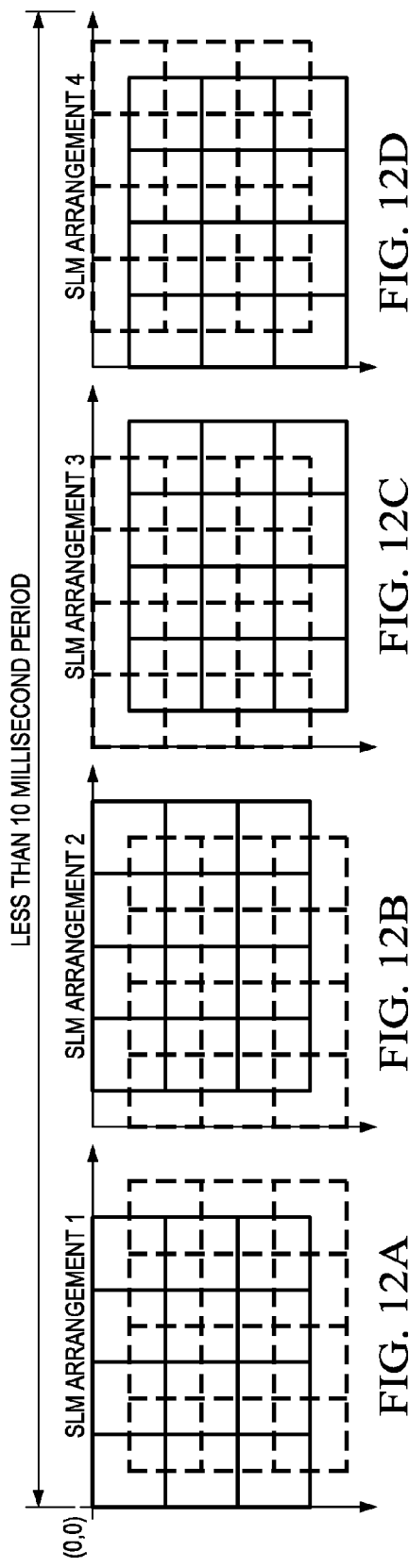
FIGS. 12A-12D illustrate in diagrams operations of another arrangement a novel optical projection system that provides an additional aspect of the present application.

In FIGS. 12A-12D, the four positions for the sub-images projected by the system in the alternative arrangement are depicted. In FIG. 12A, the first SLM arrangement position 1 is shown. In FIG. 12A the first SLM has a static image position at the origin, at position 0, 0, while the second SLM has a static image position that is diagonally offset by a portion of a pixel area by a ½ pixel in both the row and column directions to establish the diagonal offset. At FIG. 12B, the second arrangement for the two or more SLMs projecting the two sub-images is shown. In FIG. 12B, the optical actuator can be used to move the first SLM sub-image to the right by a pixel distance, to that the overlap is now different than that in FIG. 12A. In FIG. 12C, the positions of the two or more SLMs return to the positions in FIG. 12A but the color information is swapped. In FIG. 12D, the optical actuator can be operated to shift the position of the first SLM, for example, and shift the position of one of the SLMs to the right for example relative to the position of the second SLM. Thus the frame display time for the image is now divided into four offset frame times, each offset frame time displaying two sub-images superposed and offset.

When displaying a UHD video image using the four position arrangement of FIGS. 12A-D, the sub-images can each be displayed using SLMs that have a resolution of ¼ the UHD resolution. Because the human visual system will integrate the four positions, the displayed image viewed by the observer has the full frequency content of the original UHD or other high resolution video input, even though the SLMs used to display the image are only ¼ of the number of pixels of that in the high resolution image. Thus existing and commercially available DMD devices, for example, can readily be used to display ultra-high definition video images such as 4K or in the future 8K resolution without the need to provide new SLM devices having the increased number of pixels and/or increased device sizes. Thus costs for providing higher resolution projection systems can be reduced or maintained at current levels by using presently available SLMs and optical components without modification to project increasingly higher resolution images.

An advantage of the example four position arrangement shown in FIG. 11 and the image projection shown in FIGS. 12A-12D is that the signal processing can be simplified, in the sense that the diamond passband anti-aliasing filter is not required for the four position system. The overlap between the pixels in the four position system does however need pixel area overlap compensation using an inverse filter applied to the video data stream.

An advantage of the four position system of this example arrangement is that the final result, as well as the input signal, is orthogonal. In contrast, with the two position arrangement described above, the final result is arranged on a quincunx sampling lattice which does not match the orthogonal input sampling. Because the two position system creates a mismatch, it needs more signal processing to convert between the two different sampling lattices. In the four position system of the arrangement here, the two lattices are both orthogonal, simplifying the signal processing for the four position system when compared to the two position system. Both systems can be used to project high resolution images using lower resolution SLMs.

For a 100% fill factor, the optical blurring of the four position system can be modeled, for example, by a 2D finite impulse response (FIR) filter:

$$System = \begin{matrix} \frac{1}{16} & \frac{1}{8} & \frac{1}{16} \\ \frac{1}{8} & \frac{1}{4} & \frac{1}{8} \\ \frac{1}{16} & \frac{1}{8} & \frac{1}{16} \end{matrix} \quad \text{(Equation 3)}$$

An example inverse filter that can be used to compensate for the optical blurring is given by:

$$Inverse = \begin{matrix} -.0115 & .1129 & .2343 & .1129 & -.0115 \\ .1129 & -.2414 & -1.2435 & -.2414 & .1129 \\ .2343 & -1.2435 & 5.1459 & -1.2435 & .2343 \\ .1129 & -.2414 & -1.2435 & -.2414 & .1129 \\ -.0115 & .1129 & .2343 & .1129 & -.0115 \end{matrix} \quad \text{(Equation 4)}$$

Figure 13A:
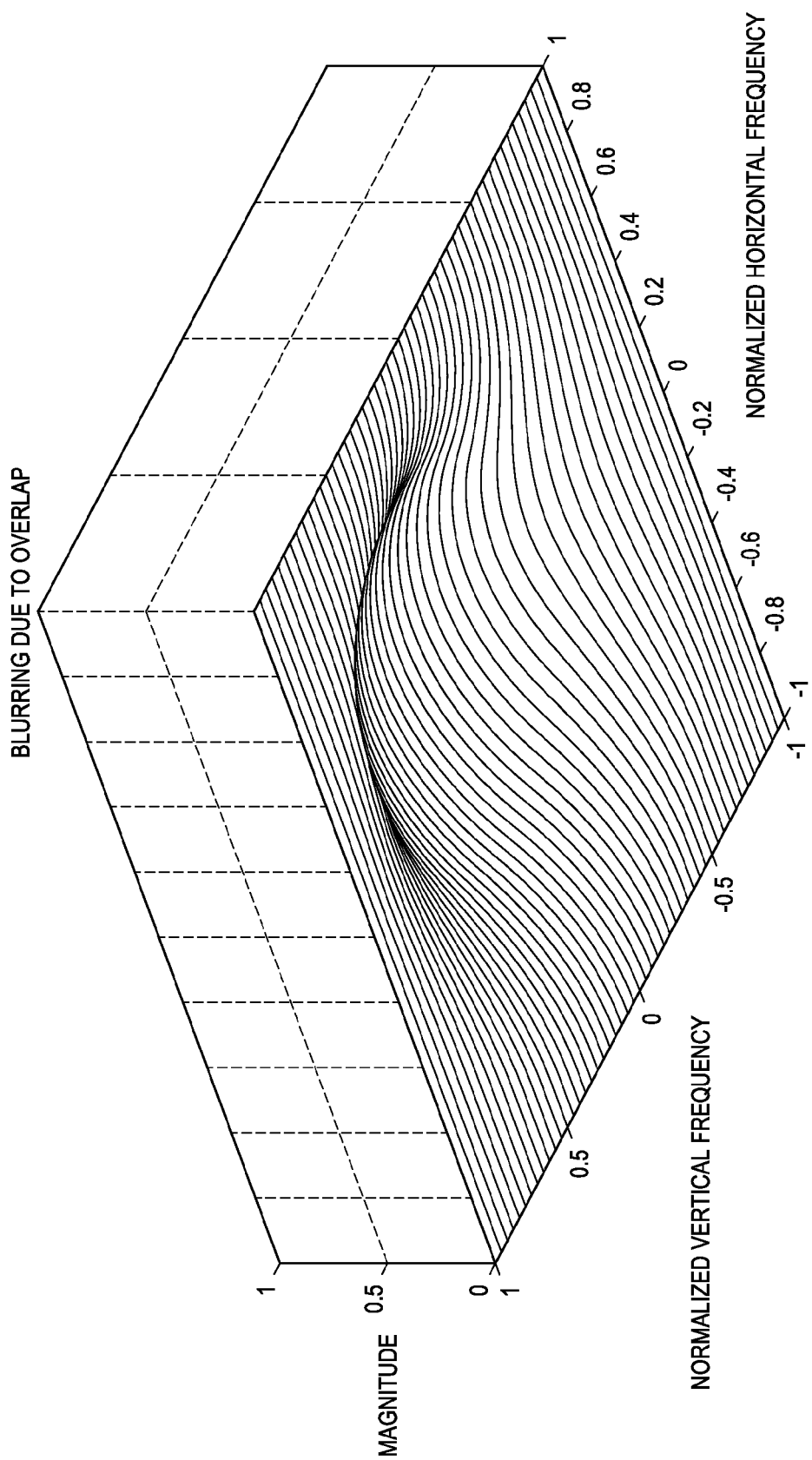
FIGS. 13A-C illustrate in frequency response diagrams an uncompensated frequency response of an arrangement of the present application, an inverse filter for compensating the response, and a convoluted result.
Figure 13B:
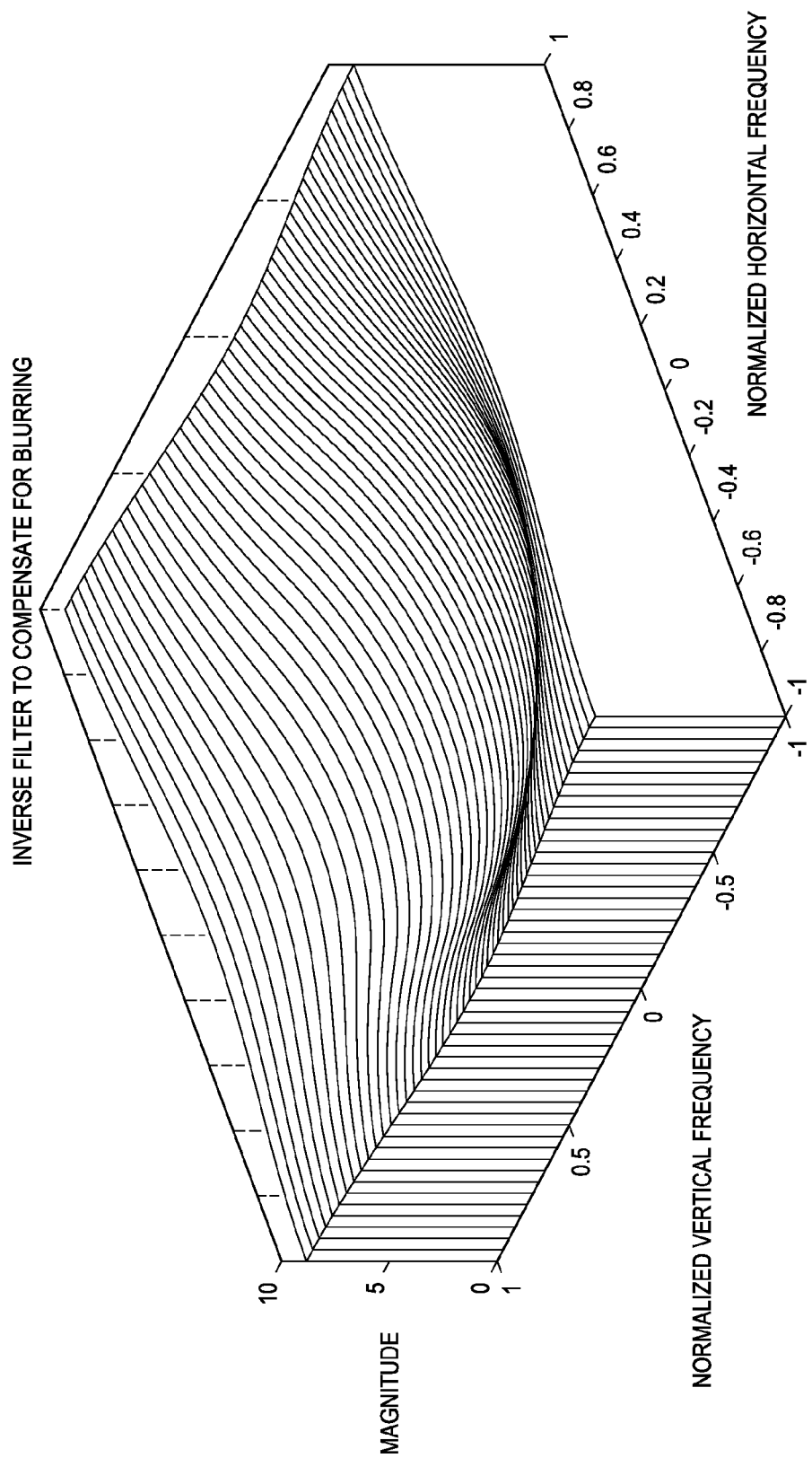
Figure 13C:
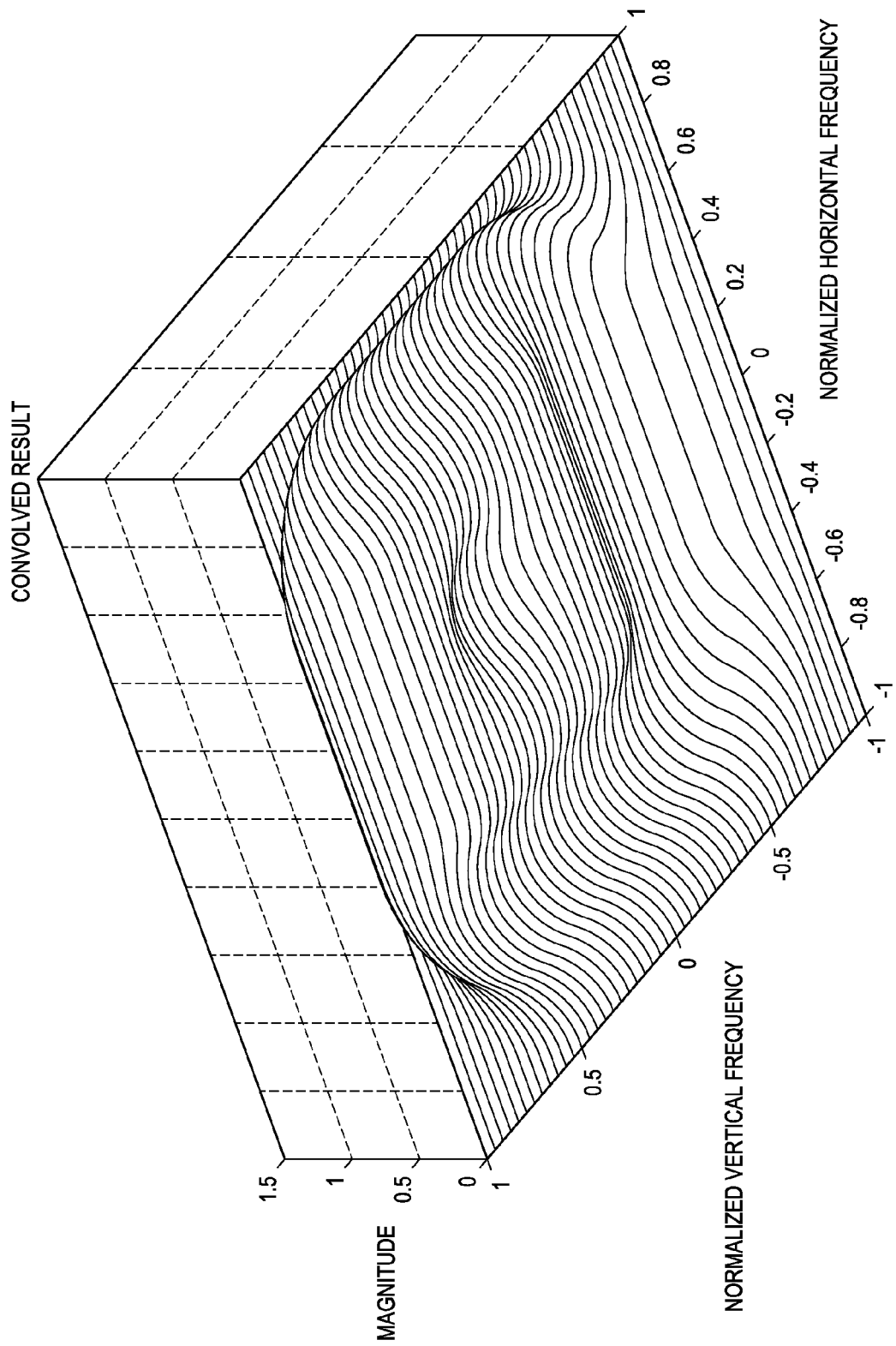

The frequency response of the optical system, the inverse filter, and the result of a convolution of the optical system and the inverse filter are shown in FIGS. 13A-C. In FIG. 13A, the frequency response is shown for a 4 position system of the arrangements is shown with the pixel overlap uncompensated. In FIG. 13B, the frequency response for an inverse filter that can compensate the image is shown. In FIG. 13C, the frequency response is shown for the compensated image after the convolution using the inverse filter in FIG. 13B is applied.

Figure 14:
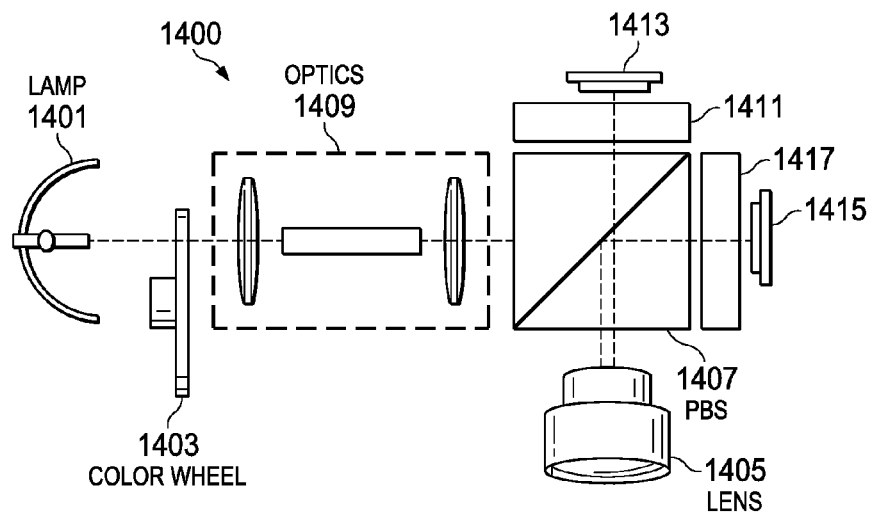
FIG. 14 illustrates in a simplified block diagram illustrating an arrangement for a projection system incorporating features of the present application.

In FIG. 14, a system 1400 for use with the arrangements above is depicted in simple block diagram and forms an additional aspect of the present application. In FIG. 14, two spatial light modulators 1413 and 1415 can be used to project the sub-images such as are described above. In the system 1400 a single lamp 1401 is used to illuminate the color wheel 1403 to form red, green and blue color light rays. In additional arrangements, the color wheel 1403 can also include segments for additional colors such as cyan, magenta, yellow, white and others. An optics function 1409 is depicted and will provide convergence and focus the light rays onto the spatial light modulators 1413, 1415. A reverse total internal reflection (RTIR) and total internal reflection (TIR) block such as 1411, 1417 can be used to separate the incoming illumination light rays and the outgoing modulated and reflected images from the SLMs 1413, 1415. The two sub-images then need to be simultaneously projected to form the high resolution image, as described above. In the novel arrangement of system 1400, a polarization beam splitter PBS 1407 can be used to form a low cost optical solution for the projection system. The light comes into the bottom half of the PBS 1407 and is split into its two polarizations (s-pol and p-pol). These two polarizations are relayed up to the DMDs 1413, 1415 by the TIR or RTIR prisms 1411, 1417. The output of the two DMDs 1413, 1415 are recombined by the PBS 1407 back onto the optical axis and sent through the projection lens 1405. The PBS 1407 passes the image from SLM 1413 directly out to the lens 1405 for focusing the image, while the PBS 1407 reflects the image from SLM 1415 to the lens 1405.

In the prior known approaches, the illumination was divided by color. Red, for example would be displayed by one device while green/blue was displayed on another. Because in these prior approaches each spatial modulator device doesn't receive all of the color information, some of the displayed pixels would be distorted in color. In sharp contrast to prior known approaches that require expensive dichroic boxes to combine the projected images from the two SLMs 1413, 1415, the PBS 1407 provides a simple low cost optical component for combining the sub-images. Further, by using the advantageous approaches of the present application of polarizing the light and using the polarization to separate the sub-frame images, each SLM device receives all of the color information. The use of polarization to divide the light between the spatial light modulator devices results in an image that is of high resolution and without color distortion, as all of the colors go to each SLM device in a cyclic fashion As described above the two sub-images corresponding to the two SLMs 1413 and 1415 are spatially offset in a diagonal direction and are contemporaneously projected for viewing together so that the two sub-images are superposed at the focal plane for observation by the viewer. The optics function 1409 uses polarization to divide the illumination rays between the first SLM 1413 and the second SLM 1415. As illustrated in the example system arrangement 1400 depicted in FIG. 14, the SLMs can be provided using DMDs. DMDs that can be used in the arrangements of the present application are commercially available from Texas Instruments Incorporated in various sizes. Because a single illumination source 1401 is used in system 1400, the two sub-images are projected in time-interleaved fashion to make them simultaneously viewable at the projection surface.

The currently available DMD devices that can be obtained from Texas Instruments Incorporated include VSP ("Voltage Scaled Pixel") technology devices, which provide an array of mirrors arranged in either a diamond or a Manhattan orientation that tilt on a diagonal axis in a +/−12 degree tilt from a flat position, and TRP ("tilt and roll pixel") technology devices, which provide an array of block shaped mirrors that tilt in a compound motion, first horizontally in one direction, and then vertically in a second direction, at a +/−17 degree tilt from a flat position. However the arrangements and the present application are not so limited and the SLMs 1413 and 1415 can be implemented using other SLMs such as LCoS devices, or by using other spatial light modulators that are available now or in future.

Figure 15:
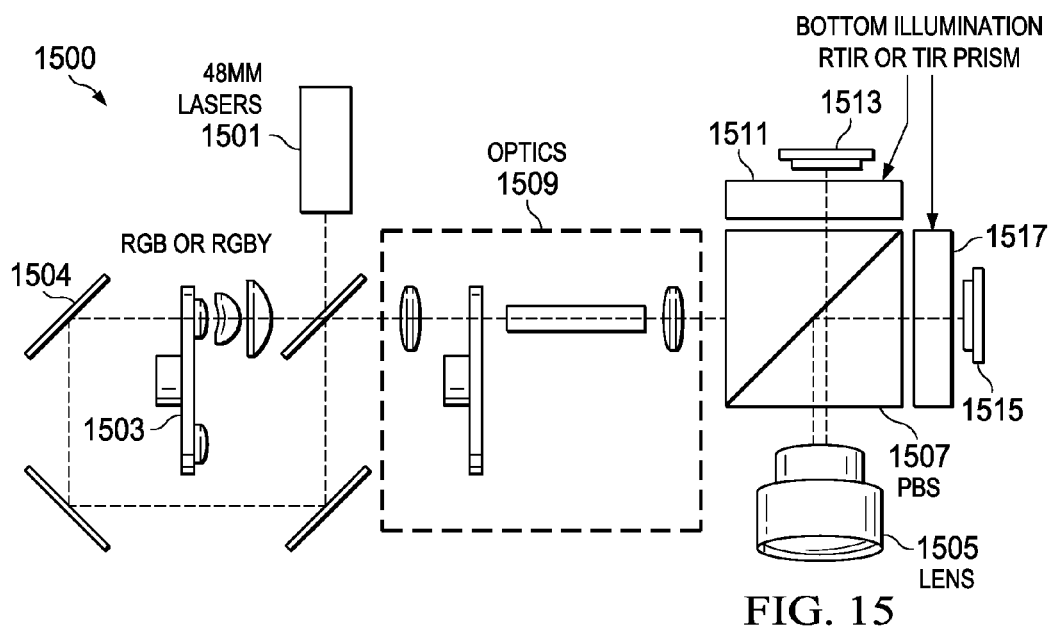
FIG. 15 illustrates in a simplified block diagram illustrating an alternative arrangement for a projection system incorporating features of the present application.

FIG. 15 depicts in another block diagram an alternative arrangement 1500 for use with the methods for displaying a high resolution image described above. The alternative arrangement forms an additional further aspect of the present application. In FIG. 15, system 1500 projects the two sub-images needed in the arrangements described above by using a laser-phosphor illumination technique. System 1500 is similar to system 1400 of FIG. 14 in other aspects, and the optics, PBS and SLMs operate in the same manner as above. Laser 1501 can be implemented for example using a blue laser such as is used in a Blu-ray device having a wavelength of 448 nanometers or so. Other lasers and other wavelength lasers can be used. The laser output is directed using mirrors such as 1504 onto a phosphor color wheel 1503 which can provide three or more colors such as red, green, blue (RGB) or RGB and yellow or other colors. The light from the phosphor color wheel is randomly polarized. The light from the color wheel is input to an illumination optics section 1509. The light from the optics 1409 is then directed onto at least two spatial light modulators such as 1413 and 1415. As shown in FIG. 15 the SLMs 1513 and 1515 can be DMD devices, alternative SLMs include, for example, LCoS devices. RTIR/TIR prisms 1511, 1517 can be used to separate the incoming light from the illumination optics from the outgoing, reflected light for the projection from the two SLMs 1513, 1515. The polarization beam splitter PBS 1507 provides a means to combine the two reflected sub-images from the two SLMs by using polarized light rays. The light comes into the bottom half of the PBS 1507 and is split into its two polarizations (s-pol and p-pol). These two polarizations are relayed up to the DMDs 1513, 1515 by the TIR or RTIR prisms 1511, 1517. The output of the two DMDs 1513, 1515 are recombined by the PBS 1507 back onto the optical axis and sent through the projection lens 1505. The light rays reflected from SLM 1513, the first SLM, pass through the PBS 1507 and into a projection lens 1505 for focus and projection onto a focal plane for viewing. The light rays from SLM 1515 are reflected by a plane within the PBS 1507 and also projected by lens 1505 for viewing. As described above, the two sub-images are displayed at locations that are spatially offset and overlapping to provide full frequency content in the superposed image that is observed by a human viewer. In system 1500 the use of a single illumination system results in a time-interleaved operation for the projection of the sub-images out of the system.

Figure 16:
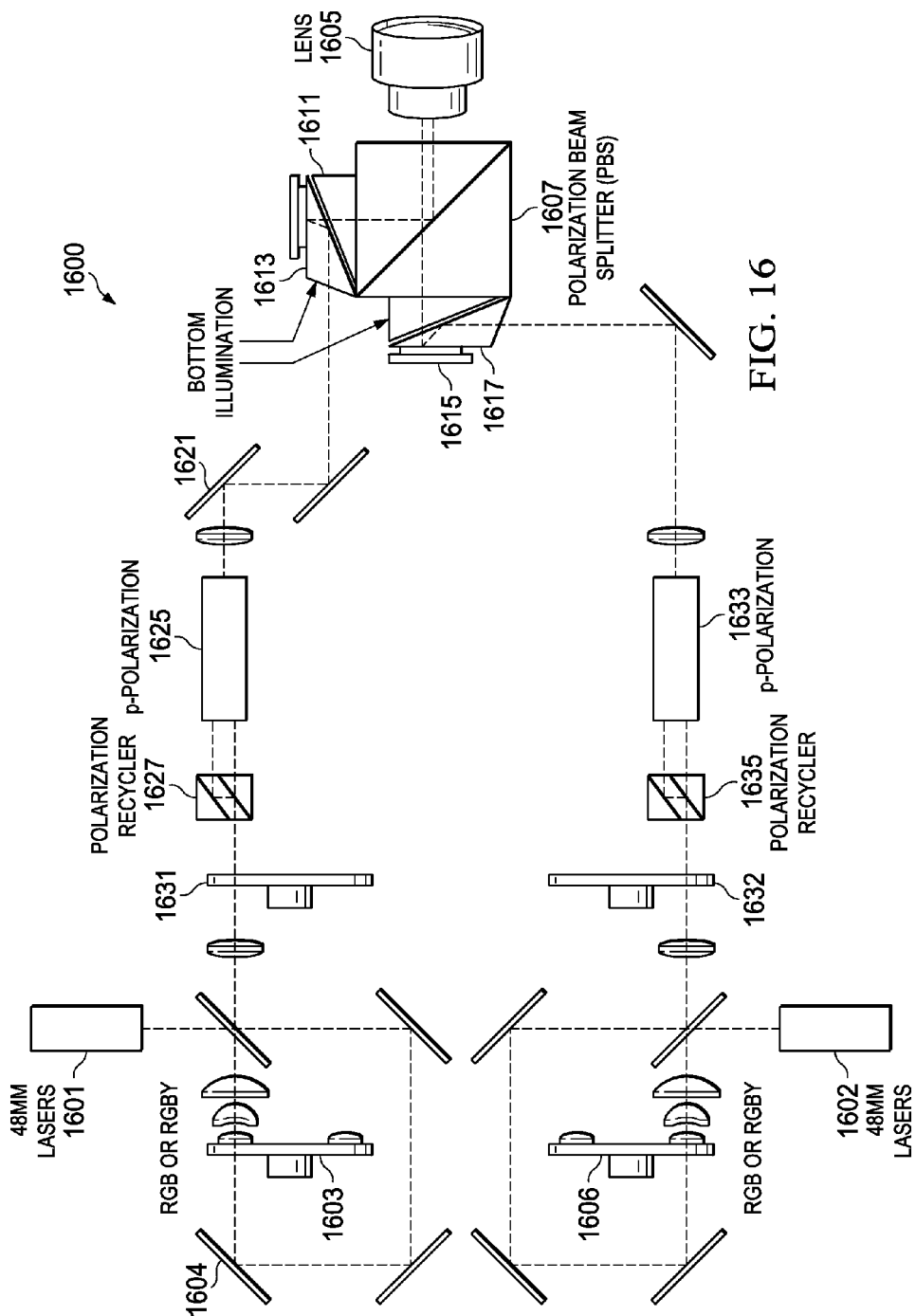
FIG. 16 illustrates in another simplified block diagram illustrating a further alternative arrangement for a projection system incorporating features of the present application.

FIG. 16 depicts another alternative arrangement in a block diagram of a system 1600. In system 1600, the projection optics including the polarization beam splitter PBS 1607, the two SLMs 1613, 1615, and the RTIR/TIR optical components 1611, 1617 used to separate the light rays from the illumination optics directed onto the SLMs from the modulated and reflected image rays coming from the SLMs are generally arranged as shown in FIGS. 14 and 15 above. In system 1600, dual illumination systems using lasers 1601, 1602 and phosphor wheels 1603, 1606 and mirrors such as 1604 are used to form red, green blue or red, green blue and yellow light rays. Other colors such as magenta and cyan can be provided. These are directed into polarization optics including wheels 1631, 1632, for example, polarization recyclers 1635, 1627 and polarizers 1625 and 1633. By polarizing the light at the upper illumination system in one direction using the s-polarization optics 1625, and polarizing the light of the lower illumination system in a second direction using the p-polarization optics 1633, the PBS 1607 can be effectively used to combine the sub-images from the two spatial light modulators SLM 1613 and the SLM 1615 and to direct these images into the projection lens 1605 for simultaneously or contemporaneously projecting the sub-images onto the focal plane for viewing. As described above, each of the DMDs 1613, 1615 will receive all of the color information and so the resulting displayed images will include all color information for each sub-image, and be of high resolution.

The use of independent dual illumination in the system of FIG. 16 has advantages in that it allows for additional brightness in the projected image by illuminating both SLMs with full brightness simultaneously. The use of the single illumination of FIG. 14 and FIG. 15 has advantages in that the thermal load is reduced at each SLM, compared to a single SLM system. The light in FIGS. 14 and 15 is divided between the two SLMs which thus results in a lower thermal load. The two sub-images are time interleaved, because in the arrangements of FIGS. 14 and 15, a single illumination source is shared between the two SLMs. In the arrangement of FIG. 16, the use of independent illumination sources results in a brighter viewable image, although the thermal load on the two SLMs is correspondingly increased.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A method for displaying images, comprising:
receiving video image data signal in a display system capable of displaying images, the video image data signal having a first resolution;
forming from the video image data signal a first sub-frame image and a second sub-frame image, each of the first and second sub-frame images having a second resolution that is lower than the first resolution;
for a first offset frame time that is less than a frame display time, simultaneously projecting a first color portion for the first sub-frame image and a second color portion for the second sub-frame image onto a focal plane; and
for a second offset frame time that is less than the frame display time, simultaneously projecting a second color portion for the first sub-frame image and a first color portion for the second sub-frame onto the focal plane;
wherein the first sub-frame and the second sub-frame are spatially offset by an offset distance that is less than a pixel pitch in the first and second sub-frames, and wherein the first color portion and the second color portion viewed together comprise color information needed to view the video image in the first resolution and in color.

2. The method of claim 1, wherein projecting the first sub-frame image and projecting the second sub-frame image further comprises projecting the first sub-frame image using a first spatial light modulator, and projecting the second sub-frame image using a second spatial light modulator.

3. The method of claim 1, wherein projecting the first sub-frame image and projecting the second sub-frame image further comprises projecting the first sub-frame image and the second sub-frame image using an optical actuator to shift the sub-frame images by a predetermined distance.

4. The method of claim 1 wherein the first sub-frame and the second sub-frame are spatially offset by a diagonal offset.

5. The method of claim 1 wherein the first sub-frame and the second sub-frame are spatially offset by an offset in one of horizontal and vertical directions.

6. The method of claim 1 and further comprising:
wherein the first color portion comprises at least one of red, green and blue color information from the video image data signal.

7. The method of claim 6 wherein the first color portion comprises the green color information from the video image data signal.

8. The method of claim 7 wherein the second color portion comprise the blue and red color information from the video image data signal.

9. The method of claim 6, wherein the second color portion comprises a color different than the first color portion that comprises at least two of the red, green and blue color information from the video image data signal.

10. The method of claim 1, wherein a sum of the first and second offset frame times is less than or equal to the frame display time.

11. The method of claim 10, wherein the first and second offset frame times are equal.

12. The method of claim 1, wherein:
the first sub-frame image and the second sub-frame image each comprise a plurality of pixels arranged in rows and columns; and
the offset is an offset approximately half of a width and half of a height of one of the pixels.

13. The method of claim 2 wherein providing the first and second spatial light modulators further comprises providing a digital micro-mirror device.

14. The method of claim 2 wherein providing the first and second spatial light modulators further comprises providing a spatial light modulator that is one selected from a group consisting essentially of a digital micro-mirror device and a liquid crystal on silicon device.

15. The method of claim 14, wherein forming from the video image data signal a first sub-frame image and a second sub-frame image further comprises:
receiving the video data image data signal having a visual resolution of X by Y pixels including color information comprising at least red, green and blue colors for each of the pixels;
dividing the image into a first sub-frame and a second sub-frame, each sub-frame having a number of pixels that is less than X by Y pixels;
using a first spatial light modulator, displaying the first sub-frame in a first color for a first offset frame display period;
using a second spatial light modulator, displaying the second sub-frame in a second color different from the first color simultaneously with the first sub-frame in the first color;
using the first spatial light modulator, displaying the first sub-frame in the second color for a second offset frame display period; and
using the second spatial light modulator, displaying the second sub-frame in the first color simultaneously with displaying the first sub-frame in the second offset frame display period;
wherein the first and second sub-frames are simultaneously displayed and have a spatial offset in a diagonal direction, the spatial offset being less than a spacing of the pixels, each of the first and second sub-frames having a visual resolution that less than the resolution of X by Y pixels, and wherein the resolution of a displayed image composed of the first and second sub-frames provides a visual resolution of at least X by Y pixels.

16. The method of claim 14, and further comprising:
after forming the first and second sub-frame images having a diagonal offset of less than one pixel pitch between the first and second sub-frame images, applying an inverse filter to offset for pixel overlap effects to the first and second sub-frame images and to compensate for an amount of fill factor.

17. A method for displaying images having increased visual resolution, comprising:
providing an image projection system configured to simultaneously project a sub-frame image for each of at least two spatial light modulators onto a focal plane, each of the spatial light modulators having a first resolution of at least X by Y pixels;
receiving visual image data, the visual image data including at least red, green and blue color information at a first image resolution greater than the first resolution;
using the visual image data, forming an intermediate image having a resolution of approximately twice the first resolution;
forming an inverse filter configured to compensate for pixel overlap in the intermediate image;
convolving the intermediate image with the inverse filter to form a compensated image;
forming a sub-frame image for display at each of the at least two spatial light modulators by sampling the compensated image to form first and second sub-frame images having a first color portion of the visual image data for each of the at least two spatial light modulators, the spatial light modulators each being configured to display different color portions of the visual image data;
simultaneously projecting for a first offset frame time the first and second sub-frame images for the first color portion on a focal plane, the first sub-frame image and the second sub-frame being spatially offset in a direction by a portion of a pixel pitch; and
simultaneously projecting for a second offset frame time on the focal plane a second color portion for the first sub-frame image and the second sub-frame image for each of the spatial light modulators, the first and second sub-frame images viewed together forming an image having all of the color information of the visual image data and having an image resolution greater than or equal to the first resolution.

18. The method of claim 17, wherein providing the at least two spatial light modulators further comprises providing a first spatial light modulator configured to project the first sub-frame image, and a second spatial light modulator and a third spatial light modulator co-located and configured to project the second sub-frame image.

19. The method of claim 18, wherein providing the spatial light modulators further comprises providing a digital micro-mirror device.

20. The method of claim 17, and further comprising providing an illumination source that further comprises providing a red, a green and a blue LED.

21. The method of claim 17, and further comprising:
providing an optical actuator between the spatial light modulators and the focal plane, and
using the optical actuator and the spatial light modulators, projecting a first and a second sub-frame image in each of four overlapping positions for an offset frame display time that is a portion of a frame time corresponding to each of the four overlapping positions, the first and the second sub-frame image being diagonally offset from one another in each of the four overlapping positions and the first and second sub-frame images displaying different color portions of the visual image data, wherein when viewed together at the focal plane, the first and the second sub-frame images form an image having all of the colors in the visual image data at a visual resolution of the first image resolution.

22. A system for displaying a high resolution video image utilizing multiple spatial light modulators, comprising:
at least one illumination source configured to provide at least red, green and blue illumination to multiple spatial light modulators;
a video data image processor coupled to receive video image data at a first visual resolution of X by Y pixels; and multiple spatial light modulators each having an image resolution lower than the first visual resolution, each configured to project an image sub-frame onto a focal plane using an image projection system;

wherein the image projection system is configured to project a first sub-frame image of a first color portion of the first visual resolution image onto the focal plane while simultaneously projecting at least a second sub-frame image of a second color portion of the first visual resolution image onto the focal plane, and the first and second sub-frame images are offset in a diagonal direction from one another, so that when viewed together a viewed image has at least the first visual resolution.

23. The system of claim 22, wherein the display system further comprises digital micro-mirror devices configured as the multiple spatial light modulators.

24. A system for projecting images, comprising:

at least one illumination source for providing color illumination;

illumination optics receiving light from the illumination source and performing a polarization of the light corresponding to multiple spatial light modulators;

RTIR prisms for receiving polarized light form the illumination optics and directing the light onto a corresponding one of the multiple spatial light modulators; and a polarized beam splitter positioned to receive reflected polarized light from multiple spatial light modulators and to direct the polarized light into a projection system;

wherein the projection system projects an image comprising multiple spatially offset sub-images that form a viewable image having a resolution higher than the resolution of the spatial light modulators.

25. The system of claim 24, wherein the multiple spatial light modulators comprise two spatial light modulators.

26. The system of claim 24, wherein the illumination source further comprises an incandescent lamp projecting light through a color wheel.

27. The system of claim 24, wherein the illumination optics further comprises an s-polarizer corresponding to one spatial light modulator and a p-polarizer corresponding to a second spatial light modulator.

28. The system of claim 24, wherein the illumination source further comprises a laser source illuminating a phosphor color wheel.

29. The system of claim 24, wherein the illumination source further comprises a pair of light sources for producing independent illumination for multiple spatial light modulators.

30. The system of claim 29, wherein the illumination source further comprises a pair of laser sources each illuminating a phosphor color wheel.

31. The system of claim 29, and further comprising a pair of illumination optics, each corresponding to a spatial light modulator, each further comprising a polarization component for producing a polarized light beam, one of the polarized light beams having an s polarization, and one of the polarized light beams having a p polarization.

32. The system of claim 24, wherein the spatial light modulators each comprise a DMD device.

33. The system of claim 24, and further comprising an optical actuator positioned between the projection system and a display surface for shifting the position of the sub-images.

34. The system of claim 33, wherein four overlapping sub-image positions are projected in a sequence.

* * * * *